US012368266B2

(12) United States Patent
Johnson et al.

(10) Patent No.: US 12,368,266 B2
(45) **Date of Patent: *Jul. 22, 2025**

(54) SELF-LOCKING CONNECTOR

(71) Applicant: Onanon, Inc., Milpitas, CA (US)

(72) Inventors: Dennis J. Johnson, Milpitas, CA (US); Keyon Keshtgar, Milpitas, CA (US)

(73) Assignee: Onanon, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,722

(22) Filed: Jul. 13, 2023

(65) Prior Publication Data

US 2023/0352876 A1 Nov. 2, 2023

Related U.S. Application Data

(63) Continuation of application No. 17/854,129, filed on Jun. 30, 2022, now Pat. No. 11,710,926, which is a (Continued)

(51) Int. Cl.

| | |
|---|---|
| ***H01R 13/639*** | (2006.01) |
| ***H01R 13/506*** | (2006.01) |
| ***H01R 13/62*** | (2006.01) |
| ***H01R 13/629*** | (2006.01) |
| ***H01R 13/64*** | (2006.01) |

(Continued)

(52) U.S. Cl.

CPC ....... *H01R 13/6205* (2013.01); *H01R 13/506* (2013.01); *H01R 13/629* (2013.01); *H01R 13/639* (2013.01); *H01R 13/64* (2013.01); *H01R 24/86* (2013.01); *H01R 2107/00* (2013.01)

(58) Field of Classification Search

CPC .............. H01R 13/6205; H01R 13/506; H01R 13/629; H01R 13/639; H01R 13/64; H01R 24/86; H01R 2107/00

See application file for complete search history.

(56) References Cited

U.S. PATENT DOCUMENTS 3,808,577 A 4/1974 Mathauser 4,703,988 A * 11/1987 Raux .................... H01R 13/622 439/321

(Continued)

*Primary Examiner* — Thanh Tam T Le

(74) *Attorney, Agent, or Firm* — Neustel Law Offices

(57) ABSTRACT

A self-locking connector provides an electrical connection between sources, equipment, devices, and the like. The self-locking connector generally includes first and second connector components with first and second housings that include corresponding electrically conductive elements, first and second magnetic elements, and first and second lock elements. One housing includes stationary and movable housing components. The connector components are brought into a coupled state with the corresponding electrically conductive elements providing an electrical connection. As the connector components are brought into the coupled state, the movable housing component automatically moves and brings the locking elements into locked engagement. The magnetic elements urge the connector components in the coupled state and the locking elements in locked engagement. The movable housing component is manually moved to bring the lock components out of locked engagement and the connector components out of the coupled state to break the electrical connection.

18 Claims, 20 Drawing Sheets

Related U.S. Application Data continuation of application No. 16/986,721, filed on Aug. 6, 2020, now Pat. No. 11,381,033.

(51) Int. Cl.

*H01R 24/86* (2011.01)
*H01R 107/00* (2006.01)

(56) References Cited

U.S. PATENT DOCUMENTS

| | | | | | |
|---|---|---|---|---|---|
| 4,801,277 | A | | 1/1989 | Seilhan | |
| 4,874,316 | A | | 10/1989 | Kamon | |
| 4,900,260 | A | * | 2/1990 | Drogo | H01R 13/622 439/339 |
| 4,927,374 | A | | 5/1990 | Batty | |
| 5,167,522 | A | | 12/1992 | Behning | |
| 5,401,175 | A | | 3/1995 | Guimond | |
| 5,637,010 | A | * | 6/1997 | Jost | H01R 13/6277 439/372 |
| 5,662,488 | A | | 9/1997 | Alden | |
| 6,297,741 | B1 | | 10/2001 | Higgins | |
| 6,464,509 | B1 | | 10/2002 | Emberty | |
| 6,561,841 | B2 | | 5/2003 | Norwood | |
| 6,568,949 | B1 | | 5/2003 | Walters | |
| 6,623,276 | B2 | | 9/2003 | Ferrerfabrega | |
| 6,994,579 | B2 | | 2/2006 | Yokoigawa | |
| 7,625,212 | B2 | | 12/2009 | Du | |
| 8,177,575 | B2 | | 5/2012 | Kataglyama | |
| 8,920,178 | B2 | | 12/2014 | Wei | |
| 9,093,783 | B2 | | 7/2015 | Grimm | |
| 9,147,965 | B2 | | 9/2015 | Lee | |
| 9,570,853 | B1 | | 2/2017 | Yu | |
| 9,680,252 | B2 | | 6/2017 | Hashiguchi | |
| 9,692,174 | B1 | | 6/2017 | Yu | |
| 9,806,451 | B2 | | 10/2017 | Ono | |
| 9,985,384 | B1 | | 5/2018 | Johnson | |
| 10,153,581 | B2 | | 12/2018 | Mitchell | |
| 10,249,994 | B2 | * | 4/2019 | Foran | H01R 24/86 |
| 10,454,208 | B2 | | 10/2019 | Johnson | |
| 10,630,024 | B1 | * | 4/2020 | Su | H01R 13/6271 |
| 10,938,149 | B2 | | 3/2021 | Li | |
| 10,998,673 | B2 | | 5/2021 | Johnson | |
| 11,108,192 | B2 | * | 8/2021 | Tie | H01R 24/005 |
| 11,165,196 | B2 | * | 11/2021 | Yonnet | H01R 13/631 |
| 11,381,033 | B2 | | 7/2022 | Johnson | |
| 2019/0115691 | A1 | | 4/2019 | Johnson | |
| 2020/0052437 | A1 | | 2/2020 | Johnson | |

* cited by examiner

FIG. 4
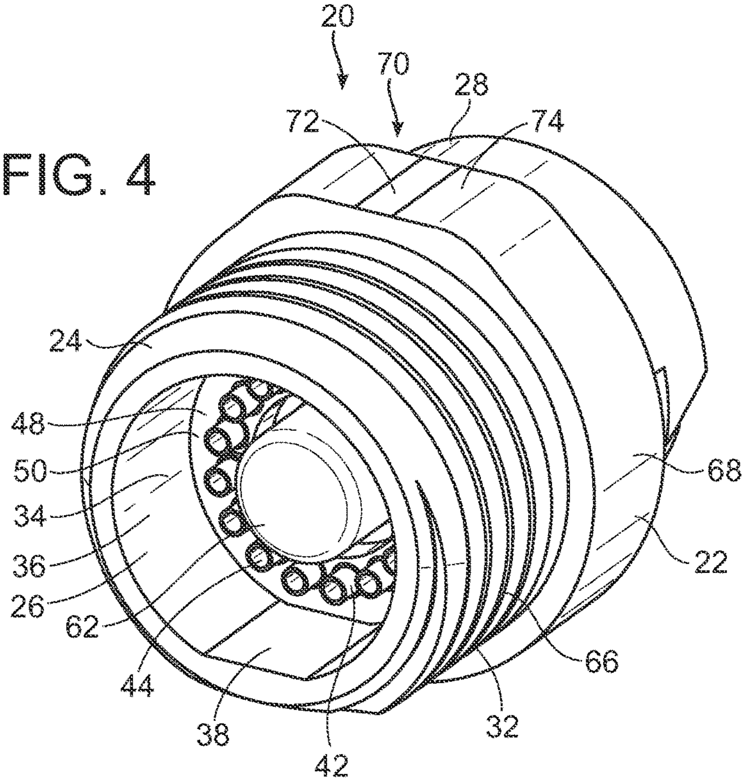
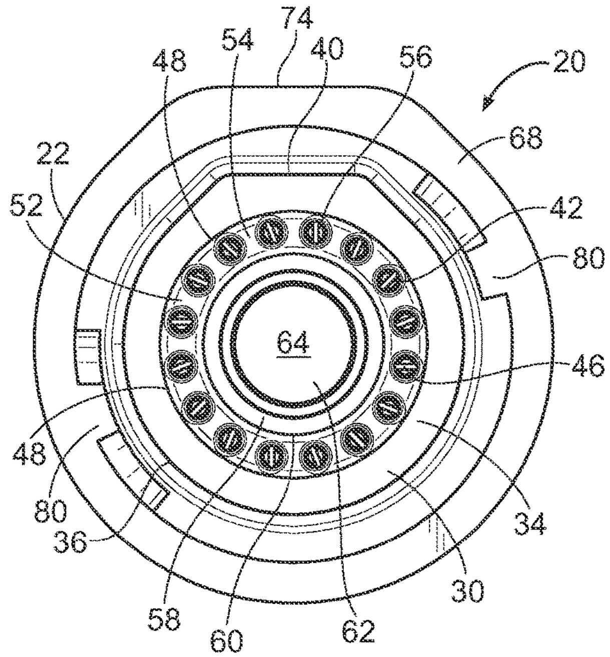
FIG. 5
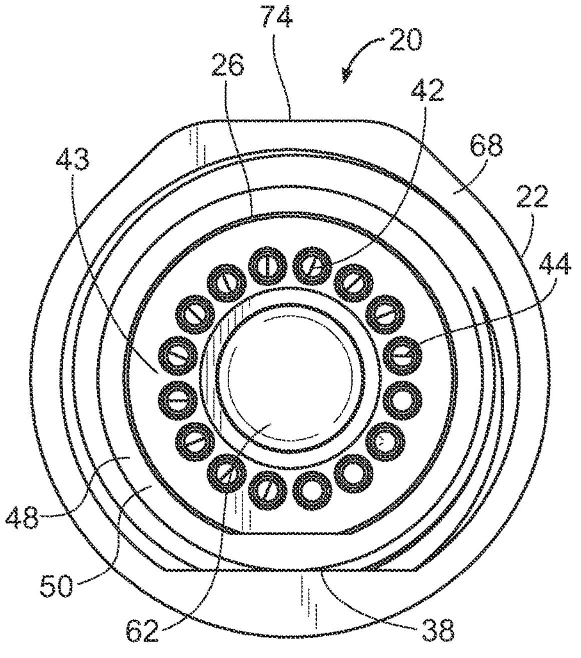
FIG. 6

SELF-LOCKING CONNECTOR

CROSS REFERENCE TO RELATED APPLICATIONS

The present application is a continuation of U.S. application Ser. No. 17/854,129 filed on Jun. 30, 2022, which issues as U.S. Pat. No. 11,710,926 on Jul. 25, 2023 and which is a continuation of U.S. application Ser. No. 16/986,721 filed on Aug. 6, 2020, which issued as U.S. Pat. No. 11,381,033 on Jul. 5, 2022. Each of the aforementioned patents and patent applications are herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a self-locking connector for providing secure electrical connections between sources of electrical power and signals and equipment, devices, or the like.

Related Art

Any discussion of the related art throughout the specification should in no way be considered as an admission that such related art is widely known or forms part of common general knowledge in the field.

There are many different connectors for electrically connecting many different types of sources and sinks of electrical power, data, and/or other electrical signals. Sources and sinks include, for example, power supplies, computers and controllers, other data sources, and various equipment and devices, among others. Additionally, some sources are also sinks and vice versa.

Some connectors include male and female connector components that are configured to be connected together to provide an electrical connection. Many such connector components are configured as two-ended connector components. They receive and connect to wires from a source or sink at one end and connect to the other connector component at the other end. Some such connectors include a plurality of electrically conductive pins in one of the connector components and a corresponding plurality of electrically conductive sockets or receptacles in the other connector component. When the connector components are connected, the pins are inserted into and make electrical contact with the corresponding sockets or receptacles. Such connectors are able to provide a plurality of electrical connections simultaneously between a source and sink. Numerous variations of multi-pin connectors are produced by a number of different companies including Winchester Electronics, Amphenol, Molex, and others. One multi-pin connector having spring-loaded pins is known as a "Pogo" @ connector and is produced by Everett Charles Technologies.

One problem with multi-pin connectors is that the pins and sockets can become damaged and/or misaligned and result in failed electrical connections and potentially permanent damage to or destruction of the connector. Such damage can occur for example if the connector components are decoupled forcefully and out of proper alignment. This can occur either intentionally through carelessness or abuse, or accidentally, such as from a cable or cord connected to the connector being tripped over. Once the pins and/or sockets are bent or otherwise damaged, subsequent attempts to connect the connector components can cause even further damage to the pins and sockets due to misalignment. If pins become broken or sockets become damaged to the point that electrical connection cannot be made between pins and sockets, the entire connector may become unusable and require replacement.

Another problem is that with repeated connections and disconnections over time, the physical connections between corresponding pins and sockets can become worn and loose. Without a way to maintain solid physical contact between corresponding pins and sockets, intermittent electrical connections can occur, for example due to vibration or movement of the connector.

Some multi-pin connectors have included one or more semi-permanent fasteners on male and female connector components. For example, certain D-sub connectors have been fitted with a threaded fastener, such as a machine screw, on an exterior stub or flange of one of the connector components, and a corresponding threaded socket on an exterior stub or flange of the other connector component. The fasteners are engaged to hold the connector components together semi-permanently. Other similar approaches have included providing the connector components with bayonet-type fasteners, snap fittings, and the like.

These approaches require manual intervention of an operator or user to fasten the connector components together. Some of types of fasteners may even require the use of hand tools, or at least a certain amount of hand strength to manually fasten the connector components together.

Moreover, in at least some applications, it is not desirable for the connector components to be permanently or even semi-permanently fastened. For example, in certain medical and other environments it may be desirable for the connector components to maintain a secure and reliable electrical connection but to be readily and quickly separable with application of a relatively small amount of force. This may be desirable for example in emergency medical situations where it is necessary to rapidly sever electrical connections and clear equipment from a space around a patient to make room for medical professionals to provide treatment.

Certain Pogo-type connectors have incorporated magnetic material in the exposed opposing faces of male and female connector components in an attempt to improve the connection between the connector components via the attraction force of the magnetic materials without using mechanical fasteners. However, such connectors have a variety of problems. For one, the magnetic materials are exposed to the surrounding environment when the male and female components are not connected and can be damaged or covered with a substance that reduces the magnetic attraction force and thus prevents the male and female components from connecting securely. For another, such connectors use spring-biased pins with a bias force opposite to the attractive force of the magnets. The connector components can therefore be inadvertently disconnected relatively easily even with the magnets present. If larger or more magnets are used, they can produce a magnetic field that can interfere with electrical signals in the connector.

The assignee of the present application has developed a series of connectors designed primarily for use with medical devices which employ magnets to help establish and maintain reliable connection between the connector components.

In these connectors, the magnets are recessed in the connector components and are thus less likely to be damaged. The attractive force of the magnets helps establish and maintain secure connection between the connector components without the use of permanent or semi-permanent fasteners and the connectors represent a vast improvement over prior Pogo-type magnetic connectors. These connectors are the subject of U.S. Pat. Nos. 9,985,384 and 10,454,208 and U.S. Patent Application Pub. No. US 2020/0052437 A1, which are assigned to the assignee of the present application.

Nevertheless, there is a need for a multi-pin self-locking connector in which the connector components are securely coupled and automatically locked to establish and maintain reliable electrical connections without the use of manual fasteners or locks. There also is a need for such a connector which employs magnet-assisted coupling and automatic locking. There also is a need for such a connector in which the connector components are able to be manually unlocked and decoupled rapidly, with little force, and without the need for hand tools or substantial hand strength.

SUMMARY

An example embodiment is directed to a self-locking connector. The self-locking connector generally includes a first connector component comprising a first electrically conductive element, a first magnetic element, and a first lock element, and a second connector component comprising a second electrically conductive element, a second magnetic element, and a second lock element. The first connector component and the second connector component are adapted to be brought together and put in a coupled state with the first electrically conductive element and the second electrically conductive element electrically coupled to make one or more electrical connections. The first lock element and the second lock element are adapted to be brought in locked engagement automatically as the first connector component and the second connector component are put in the coupled state, and to be brought out of locked engagement manually to bring the first connector component and the second connector component out of the coupled state into a decoupled state. The first magnetic element and the second magnetic element are adapted to urge the first connector component and the second connector component in the coupled state and the first lock element and the second lock element in locked engagement.

According to one aspect, the first lock element comprises one of a first lock protrusion and a first receptacle, the second lock element comprises one of a corresponding second lock protrusion and a second receptacle, and the first receptacle is adapted to receive and retain the corresponding first lock protrusion and the second receptacle is adapted to receive and retain the second lock protrusion. The first lock element also comprises a first engagement surface, the second lock element comprises a second engagement surface, and the first engagement surface and the second engagement surface are adapted for relative movable engagement in a first direction to bring the first lock element and the second lock element in locked engagement and in a second direction to bring the first lock element and the second lock element out of locked engagement. Further, at least one of the first connector component and the second connector component comprises a spring coupled with at least one of the first lock element and the second lock element to urge the first lock element and the second lock element in locked engagement According to another aspect, at least one of the first lock element and the second lock element is automatically movable relative to the other in a first direction for the first lock element and the second lock element to be brought in locked engagement, and is manually movable relative to the other in a second direction for the first lock element and the second lock element to be brought out of locked engagement.

According to another aspect, the first connector component comprises a first connector housing and the first lock element is disposed on the first connector housing, the second connector component comprises a second connector housing and the second lock element is disposed on the second connector housing, and the first connector housing is adapted to be disposed at least partially within the second connector housing with the first connector component and the second connector component in the coupled state and the first lock element and the second lock element in locked engagement.

According to another aspect, the second connector housing comprises a stationary component and a movable component, the second lock element is disposed on the movable component, and the movable component is automatically rotatably or other otherwise movable relative to the first connector housing in a first direction for the first lock element and the second lock element to be brought in locked engagement, and manually rotatably or otherwise movable relative to the first connector housing in a second direction for the first lock element and the second lock element to be brought out of locked engagement.

According to another aspect, the first connector component comprises a first orientation key, the second connector component comprises a second orientation key, and at least one of the first orientation key and the second orientation key is adapted to receive the other orientation key when the first connector component and the second connector component are in a predetermined orientation with the first lock element and the second lock element in alignment. The first connector component also has a first alignment mark, the second connector mark has a second alignment mark, and the first lock element and the second lock element are in alignment when the first alignment mark and the second alignment mark are in alignment.

There has thus been outlined, rather broadly, some of the embodiments of the self-locking connector in order that the detailed description thereof may be better understood, and in order that the present contribution to the art may be better appreciated. There are additional embodiments of the self-locking connector that will be described hereinafter and that will form the subject matter of the claims appended hereto. In this respect, before explaining at least one embodiment of the self-locking connector in detail, it is to be understood that the self-locking connector is not limited in its application to the details of construction or to the arrangements of the components set forth in the following description or illustrated in the drawings. The self-locking connector is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 4 is a perspective view of a second end of a first connector component of a self-locking connector in accordance with an example embodiment.

FIG. 5 is an end view of a first end of a first connector component of a self-locking connector in accordance with an example embodiment.

FIG. 6 is an end view of a second end of a first connector component of a self-locking connector in accordance with an example embodiment.

DETAILED DESCRIPTION

A. Overview

Figure 1:
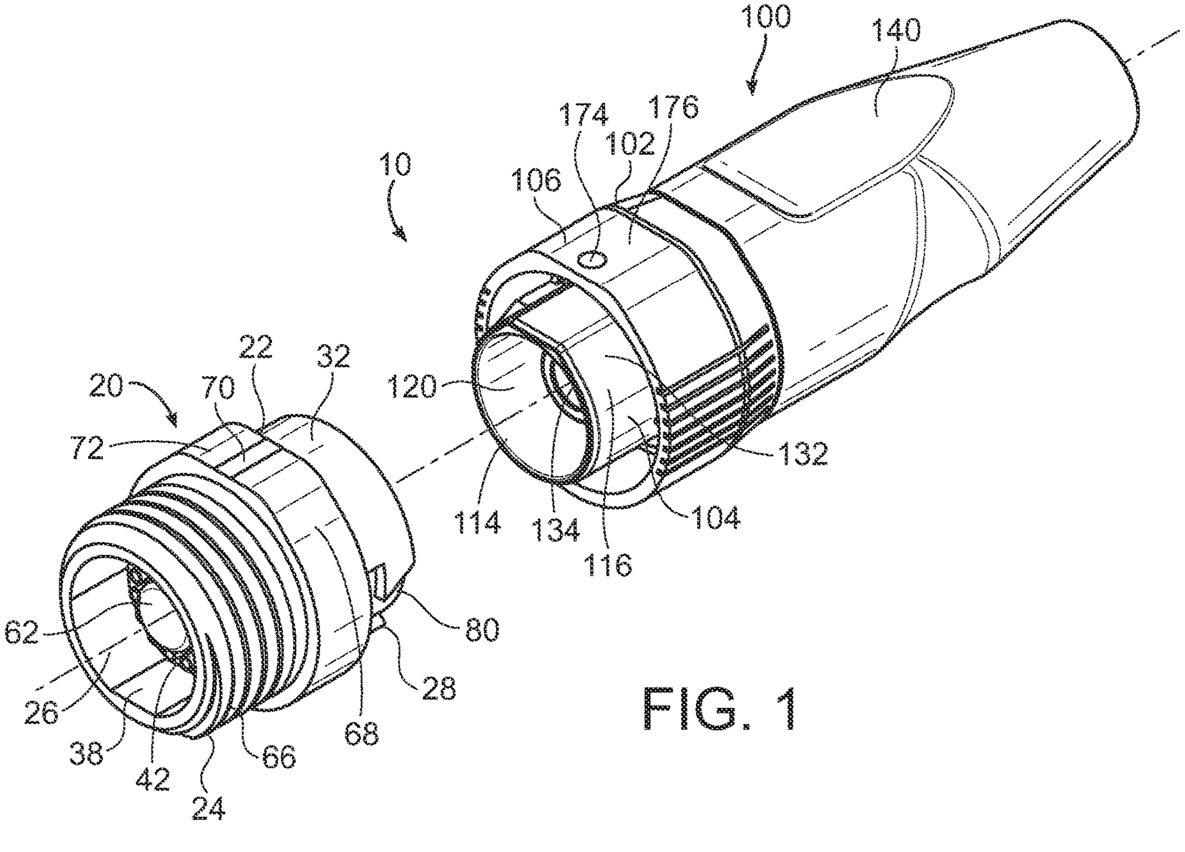
FIG. 1 is a perspective view of a self-locking connector in accordance with an example embodiment.

An example self-locking connector 10 generally comprises a first connector component 20 and a second connector component 100. The first connector component 20 and the second connector component 100 are adapted to be selectively coupled to provide an electrical connection and to be selectively decoupled and break the electrical connection.

The first connector component 20 generally comprises a first connector housing 22, one or more electrically conductive elements 42, a first magnetic element 62, and a first lock element 80. The first connector housing 22 has a first end 24 with a first end opening 26, a second end 28 with a second end opening 30, an interior space 34, and an exterior surface 32. The electrically conductive elements 42 and the first magnetic element 62 are recessed within the interior space 34 and are exposed and accessible through the first end opening 26 and the second end opening 30. The first lock element 80 is disposed on the exterior surface 32 at or near the second end opening 30. The electrically conductive elements 42 are adapted to be electrically coupled to wires or other electrical conductors of a source, cable, device, or the like through the first end opening 26 and to be electrically coupled with electrically conductive elements 126 of the second connector component 100 through the second end opening 30 to form a plurality of electrical connections.

The second connector component 100 generally comprises a second connector housing 102, one or more electrically conductive elements 126, a second magnetic element 134, and a second lock element 180. The second connector housing 102 comprises a stationary housing component 104 and a movable housing component 106. The stationary housing component 104 has a first end 108 with a first end opening 110, a second end 112 with a second end opening 114, an interior space 120, and an exterior surface 116. The electrically conductive elements 126 and the second magnetic element 134 are recessed within the interior space 120 and are exposed and accessible through the first end opening 110 and the second end opening 114. The electrically conductive elements 126 are adapted to be electrically coupled to wires or other electrical conductors of a source, cable, device, or the like through the first end opening 110 and to be electrically coupled with electrically conductive elements 42 of the first connector component 20 through the second end opening 114 to form a plurality of electrical connections.

The movable housing component 106 is rotatably or otherwise movably coupled with the stationary housing component 104 via a spring 144. The movable housing component 106 is rotatably or otherwise movable relative to the stationary housing component 104 and the first connector housing 22 of the first connector component 20 in a first direction urged by the spring 144 and in a second direction opposed by the spring 144. The movable housing component 106 has a first end 154 with a first end opening 156, a second end 158 with a second end opening 160, and an interior space 166 with an interior surface 164. The movable housing component 106 surrounds the stationary housing component 104 and the stationary housing component 104 extends through the interior space 166 and outwardly from the second end opening 160 of the movable housing component 106. The second lock element 180 is disposed within the interior space 166 on the interior surface 164 at or near the second end opening 160.

The first and second connector components 20, 100 are brought together to be put in a coupled state with their respective second ends 28, 112 and second end openings 30, 114 facing. As the first and second connector components 20, 100 are brought together, the first and second magnetic elements 62, 134 generate a force that urges the first and second connector components 20, 100 in the coupled state and the first and second lock elements 80, 180 in locked engagement.

As the first and second connector components 20, 100 are brought together, the stationary housing component 104 of the second connector housing 102 enters the interior space 34 of the first connector housing 22 and the second end 28 of the first connector housing 22 enters the interior space 166 of the movable housing component 106 of the second connector housing 102 in a nested or interleaved coupled arrangement. The electrically conductive elements 42, 126 are enclosed and electrically coupled to create a plurality of electrical connections, and the first and second magnetic elements 62, 134 are in contact or close proximity to maintain the coupled state.

As the first and second connector components 20, 100 are brought together, corresponding engagement surfaces 84, 86 and 184, 186 of the first and second lock elements 80, 180 movably engage and cause the movable housing component 106 to automatically rotate or otherwise move in a first direction relative to the first connector housing 22 under the force of the spring 144 and automatically bring the first lock element 80 and the second lock element 180 in locked engagement.

The first and second lock elements 80, 180 are manually brought out of locked engagement manually rotating or otherwise moving the movable housing 106 in a second direction relative to the first connector housing 22 in opposition to the force of the spring 144. The first and second connector components 20, 100 are then brought out of the coupled state by separating the first and second connector housings 22, 102 in opposition to the force of the first and second magnetic elements 62, 126. This electrically decouples the electrically conductive elements 42, 126 and breaks the electrical connections.

B. First Connector Component

An example embodiment of the first connector component 20 is described with reference primarily to FIGS. 1-11. The first connector component 20 generally comprises a first connector housing 22, one or more electrically conductive elements 42, a first magnetic element 62, and a first lock element 80.

1. First Connector Housing.

The first connector housing 22 has a first end 24 with a first end opening 26, a second end 28 with a second end opening 30, an exterior surface 32, and an interior space 34 with an interior surface 36.

In an example embodiment, the first connector housing 22 may have an elongated substantially cylindrical shape with a substantially circular cross-sectional shape. Alternatively, the first connector housing 22 may be constructed to have any other cross-sectional shape desired, including but not limited to a polygonal shape, an elliptical shape, or any other geometric shape.

The first connector housing 22 may be constructed of conventional electrically non-conductive insulating material. Many suitable materials, such as a variety of moldable plastics, are known to persons skilled in the art and will be found suitable for use. The first connector housing 22 may be formed by a conventional molding process, machining process, a combination of both or other suitable processes. Again, many such processes are known to persons skilled in the art and will be found suitable for this purpose.

The first end opening 26 exposes the interior space 34. The first end opening 26 may have a substantially circular shape or any other suitable geometric shape. The first end opening 26 is adapted to receive the first ends of a plurality of wires, pins or other electrical conductors adapted to conduct electrical signals and/or power. The electrical conductors may comprise or be carried by an electrical cable, or a fitting such as a socket, and may be separate individual elements. The opposite second ends of the electrical conductors may be adapted to be connected to a source of electrical signals and/or power, a piece of equipment or a device that sinks electrical power and/or signals, another electrical connector or fitting adapted to be connected to yet another cable, source, or piece of equipment, or to an intermediate device, such as a switch or multiplexer.

The first end opening 26 may comprise a first end opening key 38. The first end opening key 38 may comprise a flat as illustrated in FIG. 4. The first end opening key 38 also may comprise one or more flats, indents, or protrusions, or a combination thereof, for example. The first end opening key 38 may be formed in or located on or adjacent to a periphery of the first end opening 26 or at another location. The first end opening key 38 is adapted to enable the first end opening 26 to receive an end of a cable, socket, electrical connector or fitting, or the like in only a predetermined orientation or orientations, and to prevent reception in any other orientation.

The second end opening 30 exposes the interior space 34. The second end opening 30 may have a substantially circular shape or any other suitable geometric shape. The second end opening 30 is adapted to receive a second connector protrusion 132 of a second connector housing 102 of the second connector component 100 in a manner described further below to put the first connector component 20 and the second connector component 100 in a coupled state.

Figure 2:
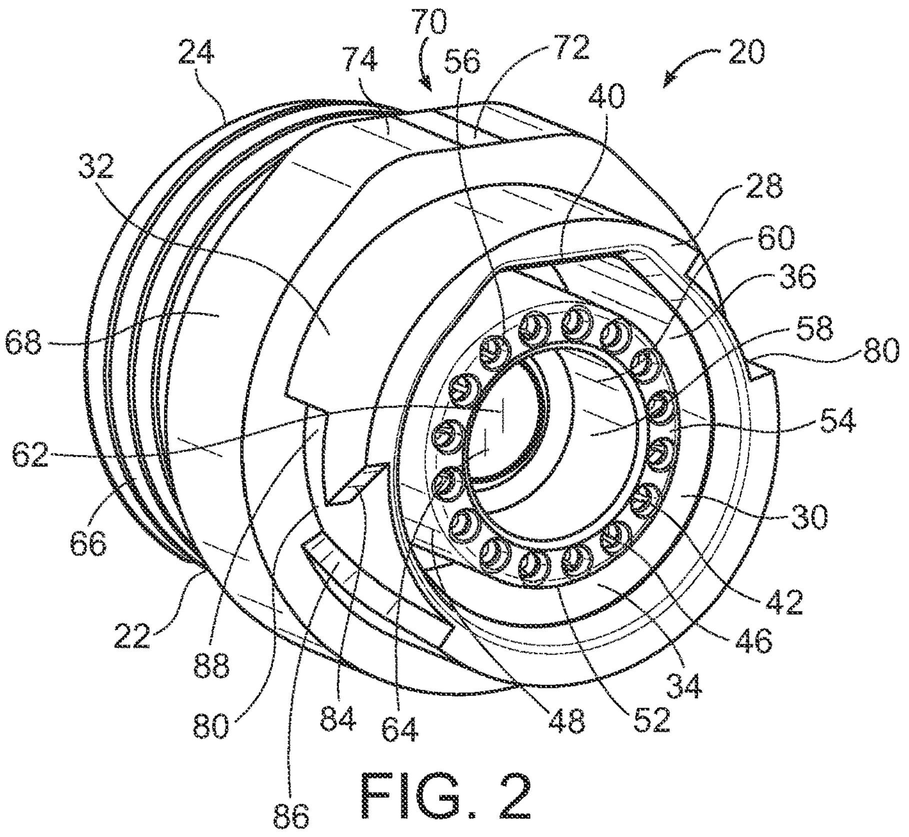
FIG. 2 is a perspective view from one angle of a first end of a first connector component of a self-locking connector in accordance with an example embodiment.
Figure 3:
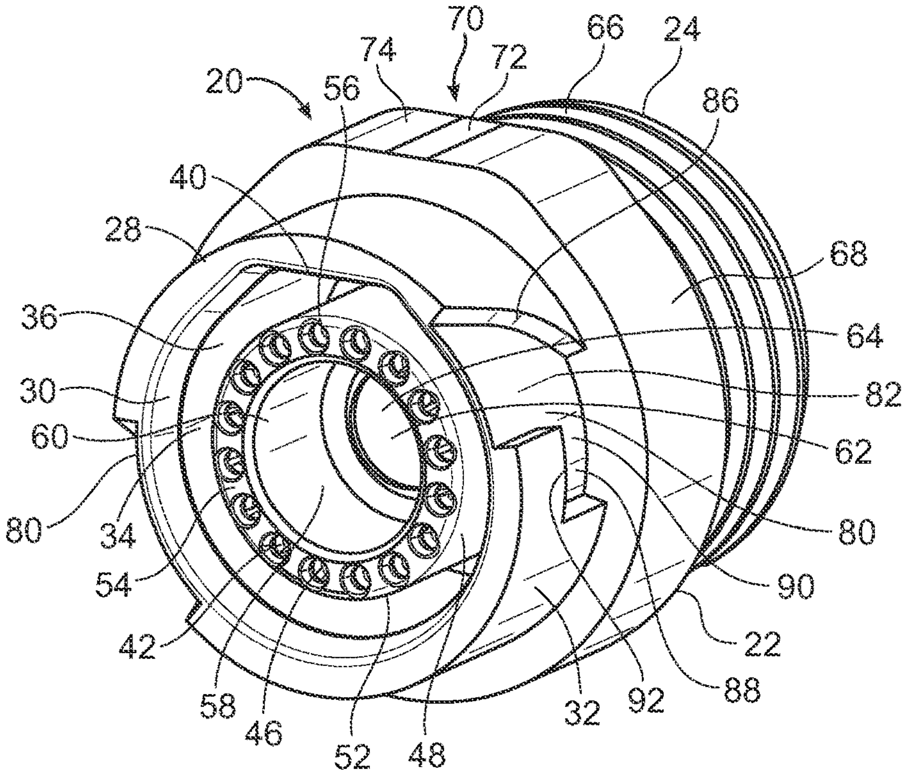
FIG. 3 is another perspective view from another angle of a first end of a first connector component of a self-locking connector in accordance with an example embodiment.
Figure 7:
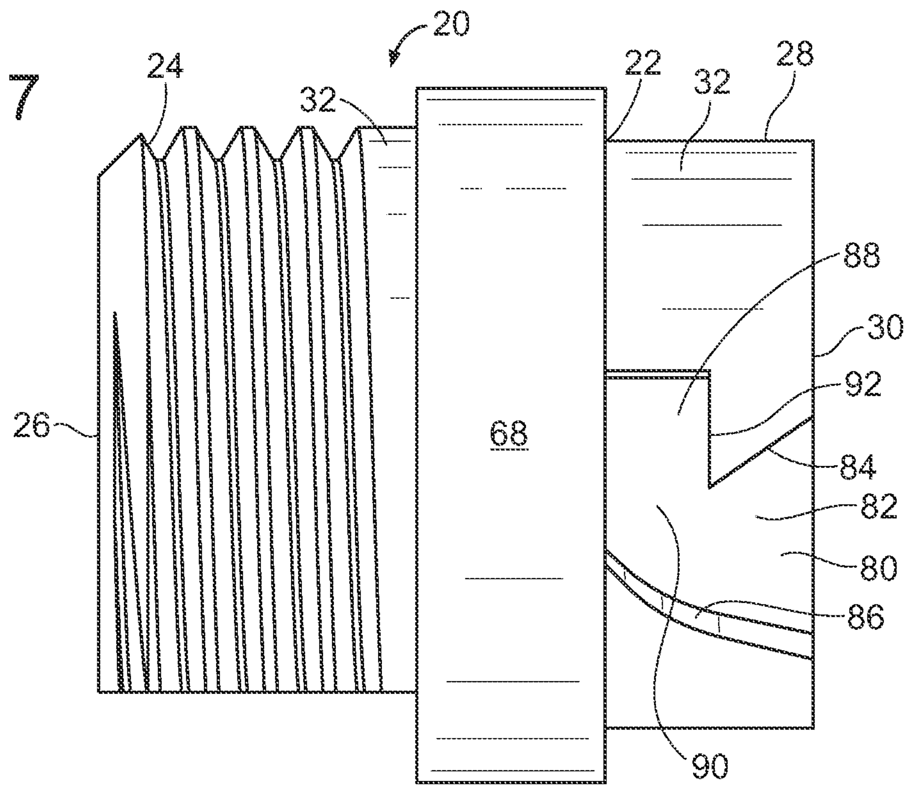
FIG. 7 is a side view of a first side of a first connector component of a self-locking connector in accordance with an example embodiment.
Figure 8:
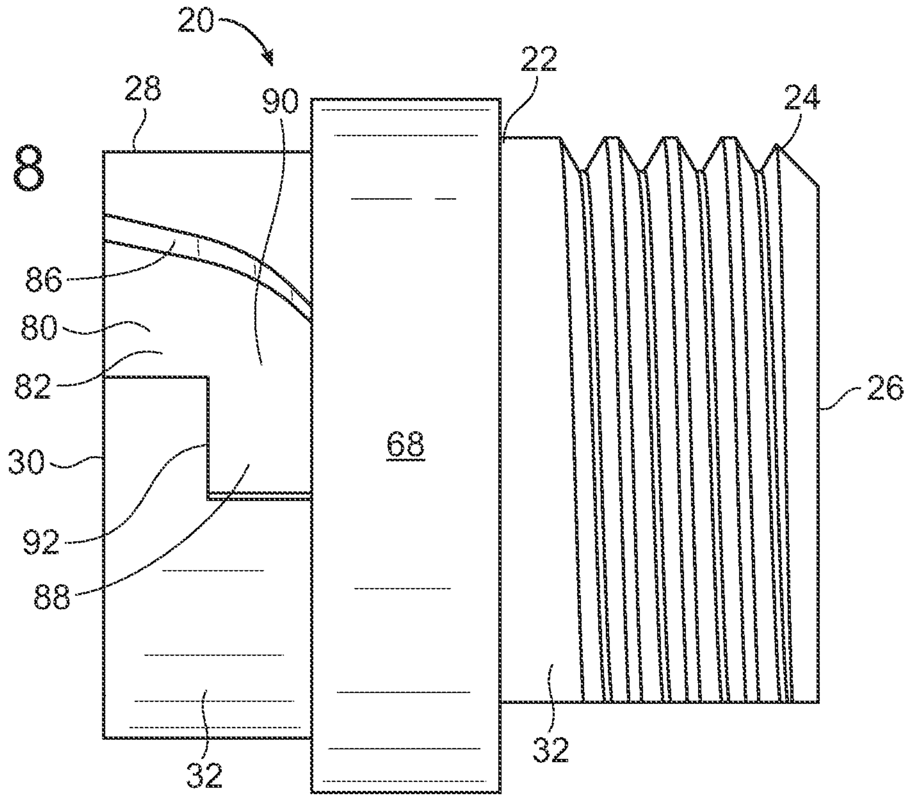
FIG. 8 is a side view of a second side of a first connector component of a self-locking connector in accordance with an example embodiment.
Figure 9:
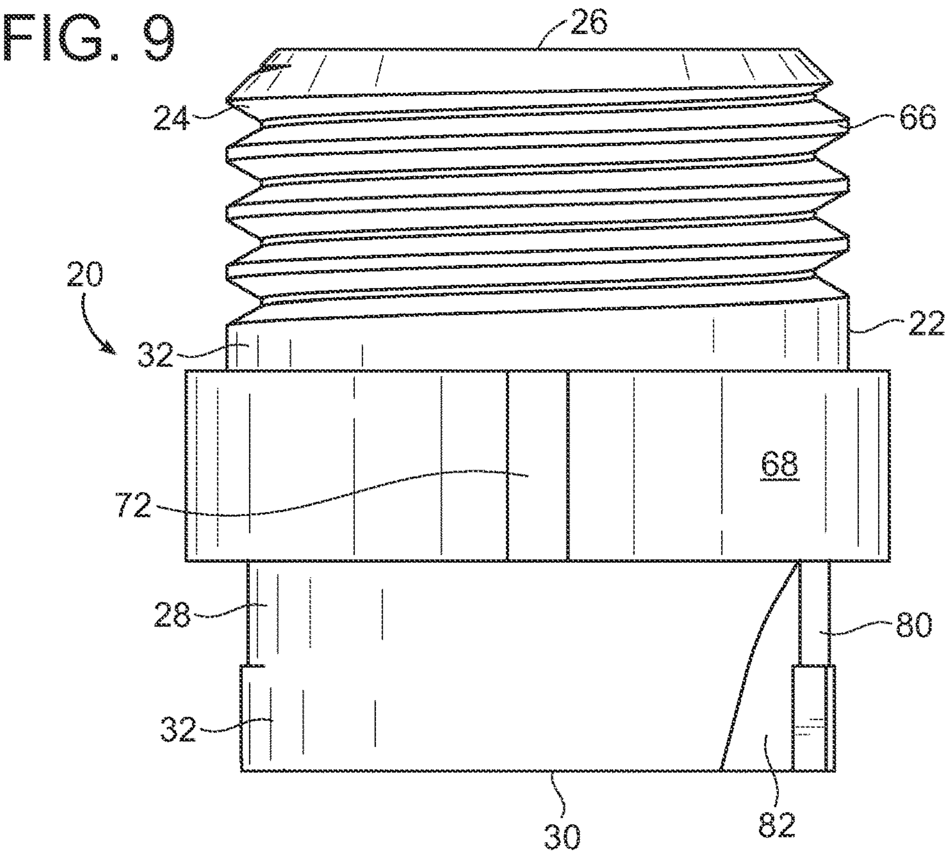
FIG. 9 is a top view of a first connector component of a self-locking connector in accordance with an example embodiment.
Figure 10:
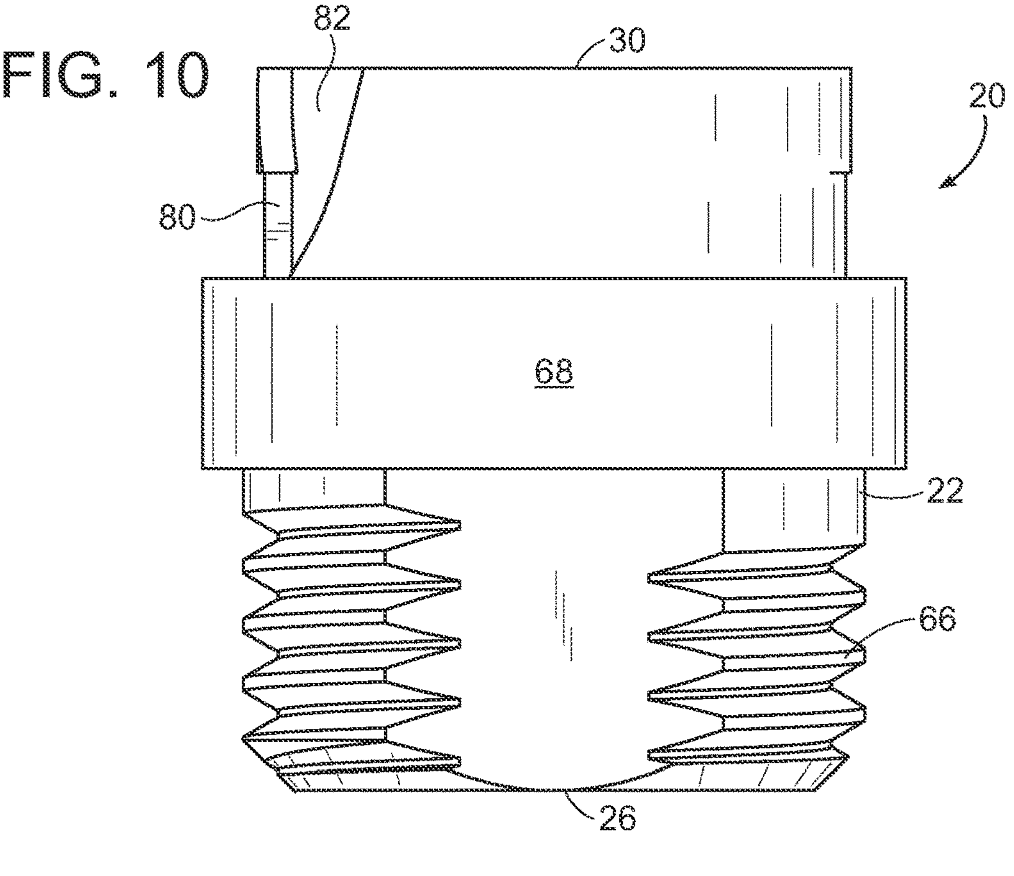
FIG. 10 is a bottom view of a first connector component of a self-locking connector in accordance with an example embodiment.

The second end opening 30 may comprise a first connector orientation key 40. The key 40 may comprise a flat as illustrated in FIGS. 2-3 and others. The key 40 also may comprise one or more flats, indents, or protrusions, or a combination thereof, for example. The key 40 may be formed in or located on or adjacent to a periphery of the second end opening 30 or at another location. The key 40 is adapted to enable the second end opening to receive the second connector protrusion 132 in only a predetermined orientation or orientations. In the predetermined orientation or orientations, the key 40 is aligned with a key 124 of the second connector housing 102, the electrically conductive elements 42 and corresponding electrically conductive elements 126 of the second connector component 100 are aligned, the first magnetic element 62 and a second magnetic element 134 of the second connector component 100 are aligned, and the first lock element 80 and a second lock element 180 of the second connector component 100 are aligned. The key 40 is adapted to prevent reception of the second connector protrusion 132 and coupling of the first connector component 20 and the second connector component 100 in any other orientation.

The one or more electrically conductive elements 42 are disposed within the interior space 34. Each electrically conductive element 42 has a first end portion 44 and a second end portion 46. Each first end portion 44 is recessed within the interior space 34 and exposed to the first end opening 26. Each second end portion 46 is recessed within the interior space 34 and exposed to the second end opening 30.

The electrically conductive elements 42 are preferably spaced apart in a predetermined arrangement that corresponds to the spacing and arrangement of the electrically conductive elements 126 of the second connector component 100 as described below. For example, the first connector housing 22 can have a longitudinal axis and the electrically conductive elements 42 can be spaced apart in a radial arrangement around the longitudinal axis.

The first connector housing 22 may comprise a first connector protrusion 48 within the interior space 34 having a first end 50 and a second end 52. The first end 50 is adapted to receive and retain the electrically conductive elements 42. The electrically conductive elements 42 may be disposed and retained within the first connector protrusion 48 in any suitable manner, for example with a press fit, a suitable adhesive, etc. Alternatively or in addition, the electrically conductive elements 42 may have a common base 43 which can be attached to the first connector protrusion 48 at or near the first end 50 in a suitable manner, e.g., press fit and/or adhesive. The electrically conductive elements 42 are preferably disposed and retained in the first protrusion 48 with their first end portions 44 exposed to the first end opening 26.

The second end 52 of the first connector protrusion 48 is exposed to the second end opening 30 of the first connector housing 22. The second end 52 comprises a surface 54 that faces and is recessed from the second end opening 30 within the interior space 34. The surface 54 has one or more openings 56 and the second end portions 46 of the one or more electrically conductive elements 42 are exposed in and accessible through the one or more openings 56 and the second end opening 30. Preferably, the one or more electrically conductive elements 42 are spaced apart in the first connector protrusion 48 and the one or more openings 56 are spaced apart on and around the surface 54 of the first connector protrusion 48.

The first connector protrusion 48 may comprise a single monolithic structure with the first connector housing 22 or a separate structure that is connected to the first connector housing 22 by suitable means. For example, the first connector protrusion 48 can be inserted in the interior space 34 of the first connector housing 22 and press fit against the interior surface 36 and/or may be welded or adhered to the interior surface 36 via a suitable adhesive.

The first connector protrusion 48 has an interior space 58 with an opening 60 that faces the second end opening 30 of the first connector housing 22. The interior space 58 is exposed to the interior space 34 and the second end opening 30 via the opening 60. The surface 54 may surround the opening 60 with the second end portions 46 of the electrically conductive elements 42 spaced apart and exposed around the periphery of the opening 60.

The interior space 58 is adapted to receive and retain the first magnetic element 62, which is described further below. The first magnetic element 62 may be retained in the interior space 58 using any suitable means including press fit, welding, adhesive, or a combination thereof. The first magnetic element 62 has a first magnetic surface 64. The first magnetic surface 64 is preferably recessed from the opening 60 within the interior space 58 with the first magnetic surface 64 exposed to, facing, and accessible through the opening 60 and the second end opening 30 of the first connector housing 22. The second end portions 46 of the electrically conductive elements 42 are thus spaced apart around the first magnetic surface 64.

When the first connector component 20 and the second connector component 100 are aligned and brought together to be put in a coupled state, the first magnetic surface 64 will preferably be aligned and in proximity with and directly facing a second magnetic surface 136 of the second magnetic element 134 of the second connector component 100. The first and second magnetic elements 62, 134 are adapted together to generate a force to urge the first connector component 20 and the second connector component 100 in the coupled state and the first lock element 80 and the second lock element 180 of the second connector component 100 in locked engagement. For example, the first connector housing 22 can have a longitudinal axis and the first magnetic element 62 can be positioned on and aligned with the longitudinal axis with the second magnetic element 134 being similarly positioned and aligned in the second connector housing 102 described further below. Preferably, when the first connector component 20 and the second connector component 100 are in the coupled state, the first magnetic surface 64 will be in contact or in close proximity with a second magnetic surface 136 of the second magnetic element 134 to maintain the coupled state.

As will become apparent from the foregoing and additional description below, the first connector protrusion 48 and a second connector protrusion 132 of the second connector housing 102 of the second connector component 100 preferably are arranged and configured to be coupled in a nested or interleaved arrangement when the first connector component 20 and the second connector component 100 are put in the coupled state. More particularly, when the first connector component 20 and the second connector component 100 are put in the coupled state, the second connector protrusion 132 is received and extends within the interior space 34 of the first connector housing 22 while the first connector protrusion 48 is received and extends within an interior space 120 of the second connector protrusion 132 with the second connector protrusion 132 substantially surrounding and enclosing the first connector protrusion 48. The interleaved coupling arrangement encloses and surrounds the electrically conductive elements 42, 126 and the first and second magnetic elements 62, 134 within the first and second connector housings 22, 102 and isolates and protects them from the exterior environment.

The first connector protrusion 48 can be formed or constructed in a substantially cylindrical shape with a substantially circular cross-section if desired. Alternatively, the first connector protrusion 48 can be formed in any other geometric shape with any other cross-sectional shape that is suitable.

The first connector housing 22 and the first connector protrusion 48 each can have a longitudinal axis and can be arranged to be co-axial. The first connector housing 22 and the first connector protrusion 48 also can be arranged to be concentric.

The exterior surface 32 at or near the first end 24 of the first connector housing 22 may be provided with a first end connector 66. The first end connector 66 may comprise a threaded connector as illustrated in FIG. 4. The first end connector 66 may also comprise a snap connector, bayonet connector, or any other suitable type of connector. The first end connector 66 is adapted to enable the first connector component 20, and more specifically the first connector housing 22, to be connected temporarily, semi-permanently, or permanently to another connector, a device, a piece of equipment, a housing of a device or piece of equipment, a panel of a cabinet, or the like having a corresponding connector.

The exterior surface 32 also may be provided with a collar 68 between the first end 24 and the second end 28. The collar 68 may protrude outwardly from and may extend circumferentially around the exterior surface 32. The collar 68 may comprise a first connector alignment mark 70. As will become apparent from further description below, the collar 68 is adapted to engage a surface 170 of the second connector housing 102 of the second connector component 100 when the first connector component 20 and the second connector component 100 are put in a coupled state to prevent over-insertion of the components of the respective connectors and to facilitate proper coupling, locking, and electrical connection.

A first connector alignment mark 70 may be provided on the collar 68 or in another location on the first connector housing 22. The first connector alignment mark 70 may comprise a visual mark, such as a line 72 or other visual representation, and/or a tactile mark, such as a flat 74 or other geometric shape. The first connector alignment mark 70 is adapted to indicate the orientation of the first connector component 20 in relation to the second connector component 100 to facilitate putting the first connector component 20 and the second connector component 100 in the coupled and locked state. The first connector alignment mark 70 is adapted to be used with a second connector alignment mark 172 of the second connector component 100, which is described further below. When the first connector alignment mark 70 and the second connector alignment mark 172 are aligned, it indicates that the first connector component 20 and the second connector component 100 are in the proper orientation to be put in the coupled state. More specifically, it indicates that the corresponding electrically conductive elements 42, 126 are in proper alignment to form an electrical connection, the first and second magnetic elements 62, 134 are aligned, and the first and second lock elements 80, 180 are in proper alignment to be automatically brought in locked engagement.

The first lock element 80 of the first connector component 20, which is described further below, may be provided on and/or in the exterior surface 32 at or near the second end 28. The exterior surface 32 may have a substantially circular cross-sectional shape or other geometric cross-sectional shape and may extend completely or partially around the second end opening 30. The first lock element 80 may comprise one or a plurality of lock elements 80 spaced apart on and/or in the exterior surface 32. The lock elements 80 may be spaced apart radially. The first lock element 80 is preferably located between the second end 28, and more specifically the second end opening 30, and the collar 68. The first lock element 80 is preferably arranged and spaced to align with the second lock element 180 of the second connector component 100 when the first and second connector components 20, 100 are aligned to be put in the coupled state. As further described below, the first lock element 80 is adapted to be automatically brought locked engagement with the second lock element 180 when the first connector component 20 and the second connector component 100 are put in the coupled state.

2. Electrically Conductive Elements.

The one or more electrically conductive elements 42 are adapted to be electrically coupled with one or more corresponding electrically conductive elements 126 of the second connector component 100 to provide one or a plurality of electrical connections when the first connector component 20 and the second connector component 100 are put in a coupled state. Similarly, when the first and second connector components 20, 100 are brought out of the coupled state, the electrically conductive elements 42 are adapted to be electrically decoupled from the corresponding electrically conductive elements 126 to break the electrical connections.

As described above, each electrically conductive element 42 has a first end portion 44 and a second end portion 46. The first end portion 44 is preferably adapted to be electrically coupled to an end of an electrical conductor to receive and/or transfer electrical signals and/or power. The second end portion 46 is preferably adapted to be electrically coupled to a second end portion 130 of a corresponding electrically conductive element 126 of the second connector component 100 to form an electrical connection.

The electrically conductive elements 42 may comprise a plurality of separate structures or may comprise a single unitary structure. The electrically conductive elements 42 can be mounted or connected to a common base 43 or other common mounting structure, which will preferably comprise an electrically non-conductive insulator.

In particular embodiments, the one or more electrically conductive elements 42 may comprise one or more electrically conductive pins, electrically conductive sockets or receptacles, or a combination thereof. The one or more electrically conductive elements 42 also may comprise one or more electrical contacts and/or one or more non-contact electrodes. In embodiments in which the electrically conductive elements 42 comprise sockets or receptacles, pins, contacts, or a combination thereof, the electrically conductive elements 42 may be electrically coupled with corresponding electrically conductive elements 126 by being brought into and maintained in physical contact with the electrically conductive elements 126. In embodiments in which the electrically conductive elements 42 comprise non-contact electrodes or other non-contact electrical elements, they may be electrically coupled with corresponding electrically conductive elements 126 by being brought into proximity but not necessarily physical contact.

The electrically conductive elements 42 may be constructed of any suitable electrically conductive materials, including for example various copper alloys such as brass, phosphor-bronze, or other alloys, and may be plated with various well-known plating materials such as gold, nickel, palladium, tin, or others, depending on application requirements. The electrically conductive elements 42 may be formed by any suitable means, including for example molding, stamping, machining, metal forming processes, or a combination thereof. Electrically conductive elements 42 comprising sockets or receptacles may include solder cups, solder tails, crimp structures, or a combination of elements to facilitate soldered and/or mechanical electrical connection with the ends of wires or other electrical conductors described above.

Figure 11:
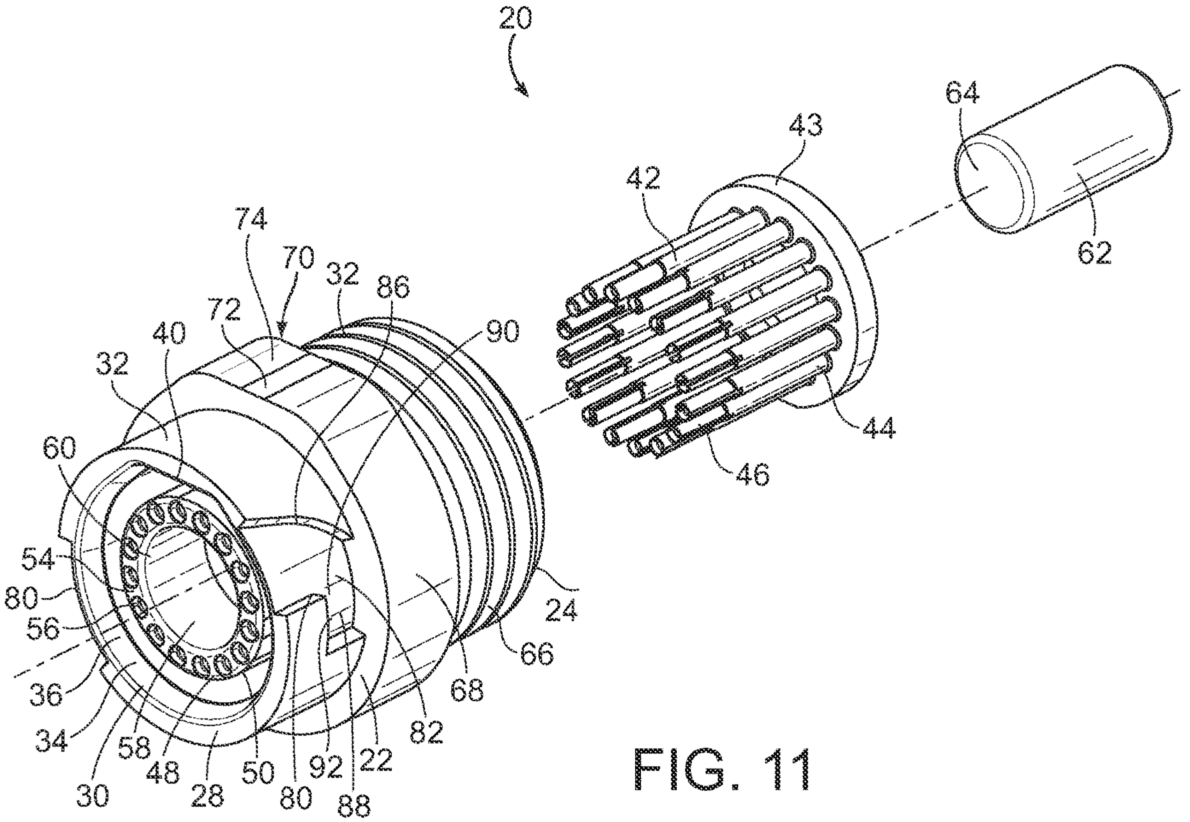
FIG. 11 is an exploded perspective view of a first connector component of a self-locking connector in accordance with an example embodiment.

In one example embodiment of the first connector component 20 and as best illustrated in FIG. 11, the electrically conductive elements 42 may comprise a plurality of elongated electrically conductive sockets or receptacles. The sockets or receptacles may comprise elongated at least partially hollow substantially cylindrical structures. The electrically conductive sockets or receptacles may be as shown and described in U.S. patent application Ser. No. 15/782,997, now U.S. Pat. No. 9,985,384, for Magnetic Latching Connector, and U.S. patent application Ser. No. 15/988,076, now U.S. Pat. No. 10,454,208, for Magnetic Latching Connector, both assigned to the assignee of the present application and both incorporated herein by reference as if set forth in their entirety.

In this example embodiment, the first end portions 44 of the sockets or receptacles may have openings and are preferably adapted to be physically and electrically connected to the ends of wires, pins or other electrical conductors, such as described above, to receive electrical signals and/or power. The physical and electrical connection may be made via solder or another means of mechanical connection. The connection may be made directly or indirectly. For example, the ends of the electrical conductors may be connected to a set of attachment points location on a circuit board and the first end portions 44 of the sockets or receptacles may be connected to the same or another set of attachment points on the circuit board either directly or via jumper wires for example.

Figure 21:
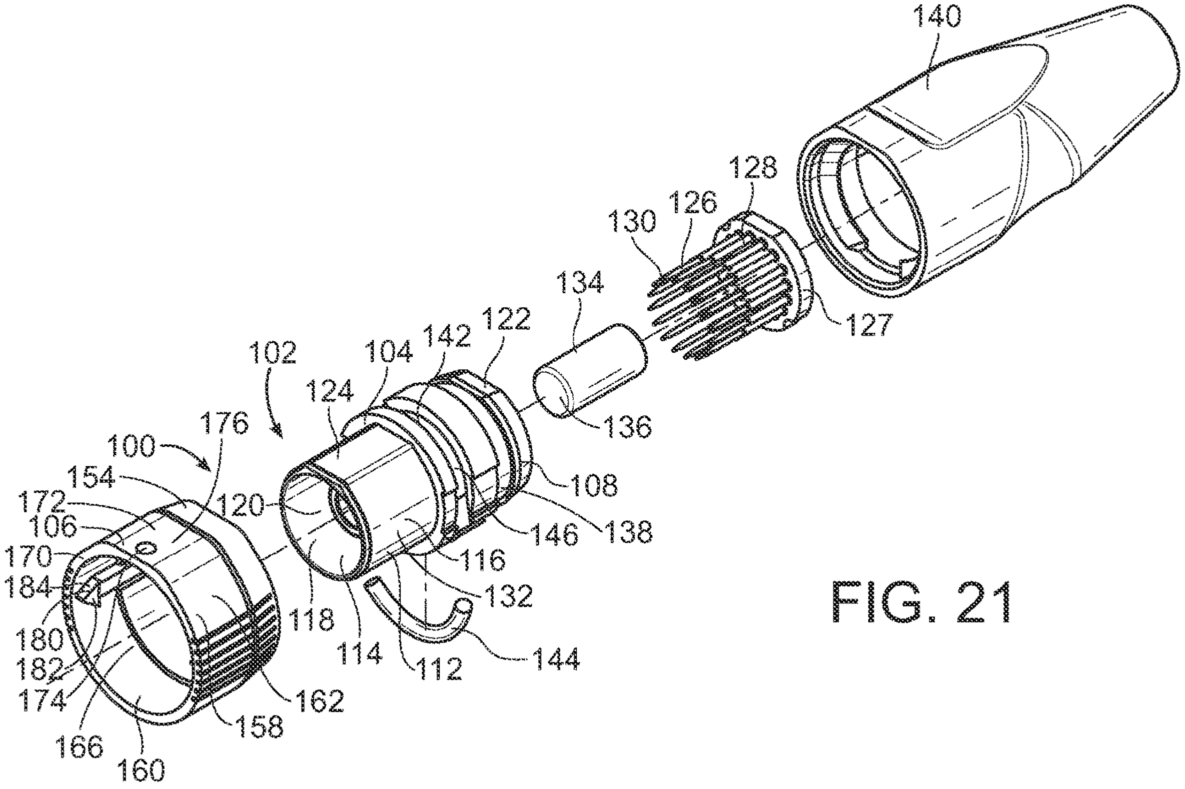
FIG. 21 is an exploded perspective view of a second connector component of a self-locking connector in accordance with an example embodiment.
Figure 22:
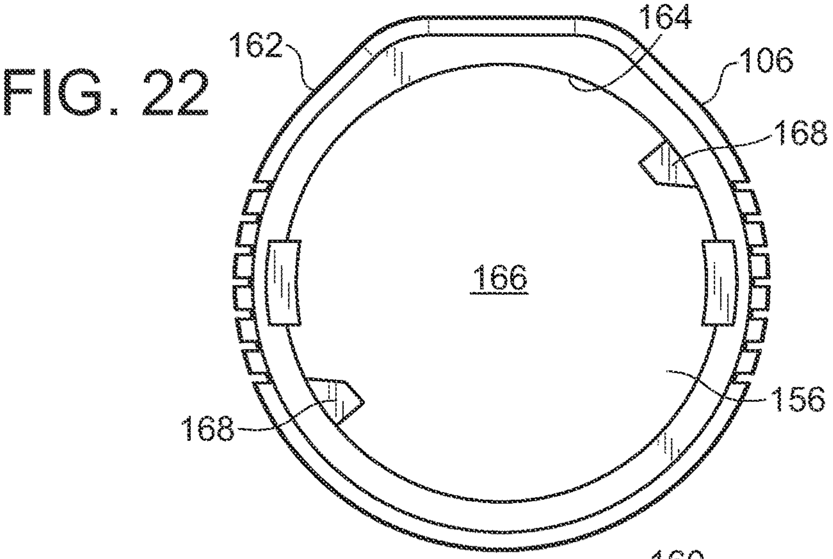
FIG. 22 is an end view of a first end of a movable housing component of a second connector component of a self-locking connector in accordance with an example embodiment.
Figure 23:
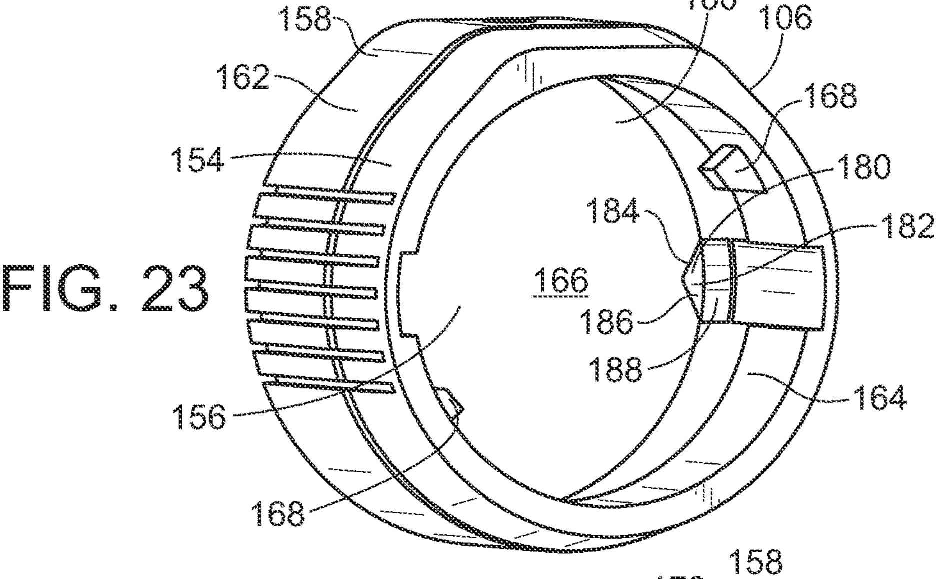
FIG. 23 is a perspective view from one angle of a first end of a movable housing component of a second connector component of a self-locking connector in accordance with an example embodiment.
Figure 24:
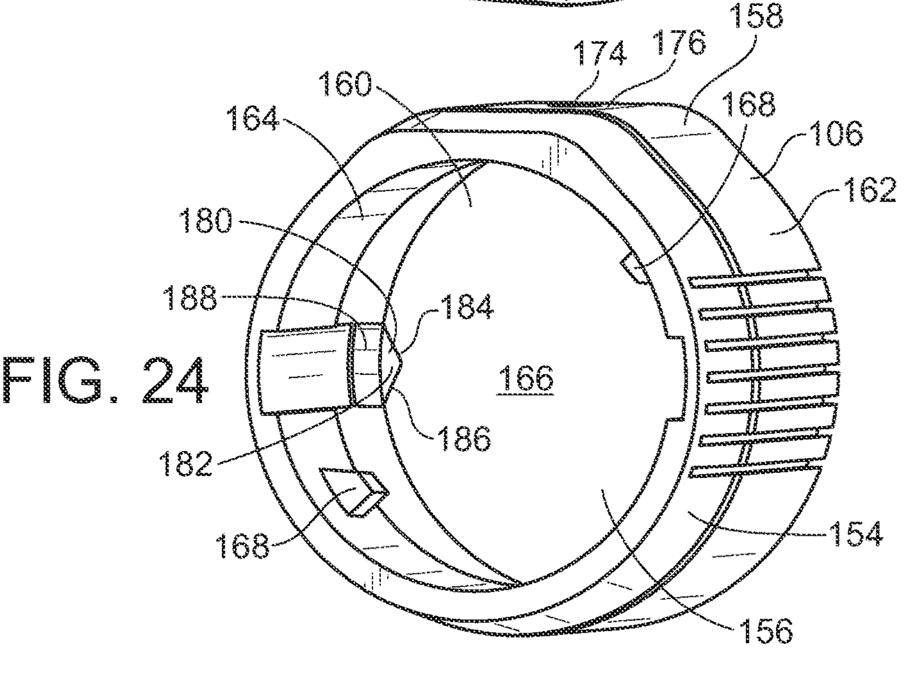
FIG. 24 is a perspective view from a second angle of a first end of a movable housing component of a second connector component of a self-locking connector in accordance with an example embodiment.
Figure 25:
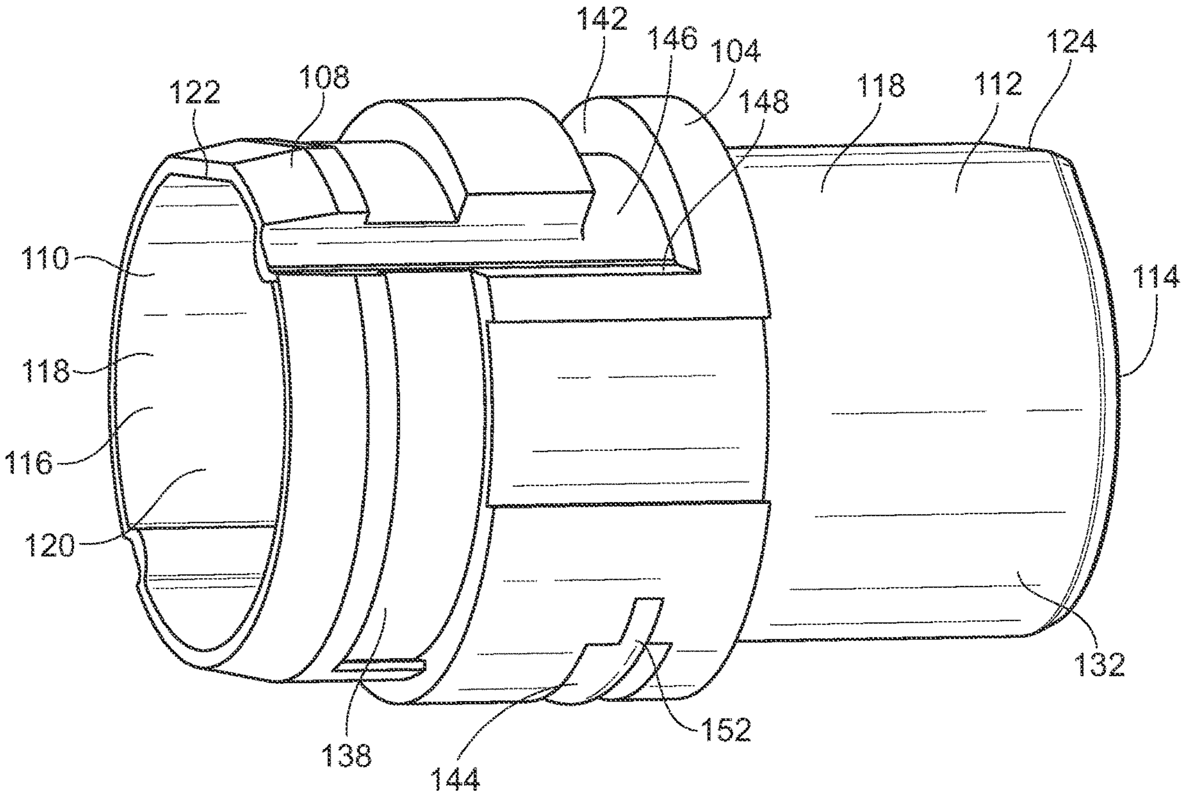
FIG. 25 is a side perspective view of a first side of a stationary housing component and spring of a second connector component of a self-locking connector in accordance with an example embodiment.
Figure 26:
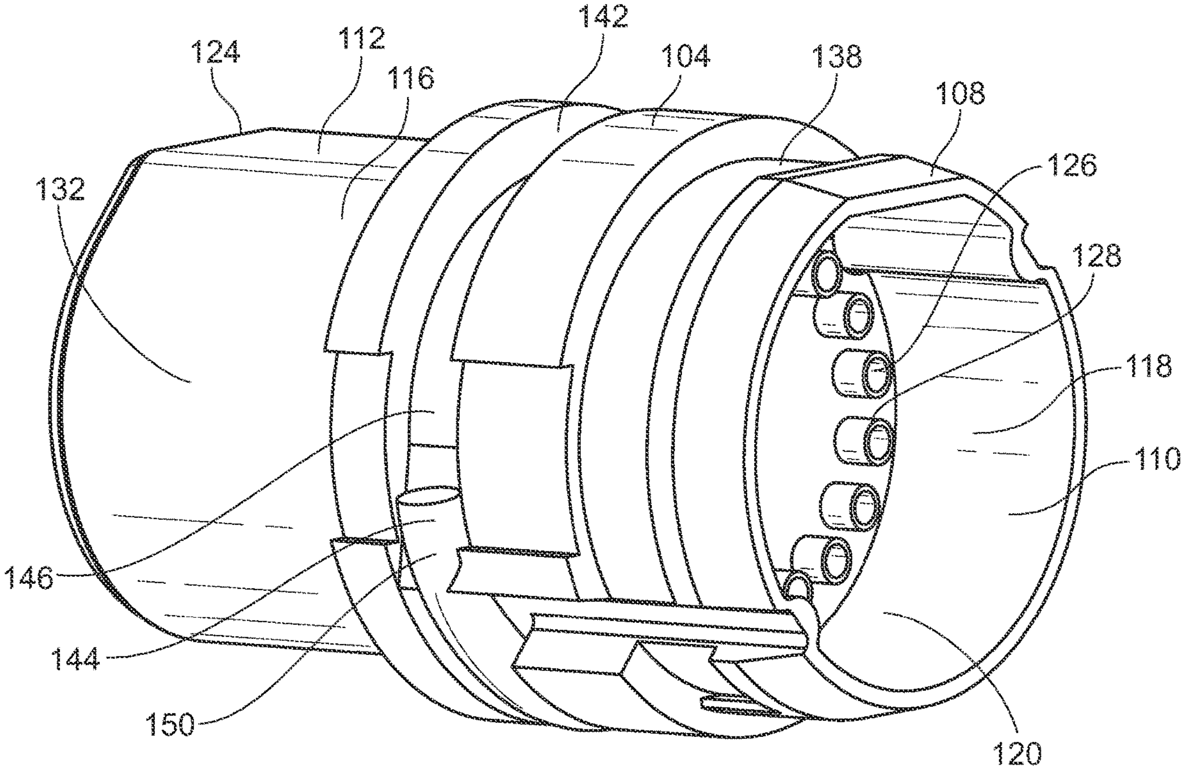
FIG. 26 is a side perspective view of a second side of a stationary housing component and spring of a second connector component of a self-locking connector in accordance with an example embodiment.
Figure 27:
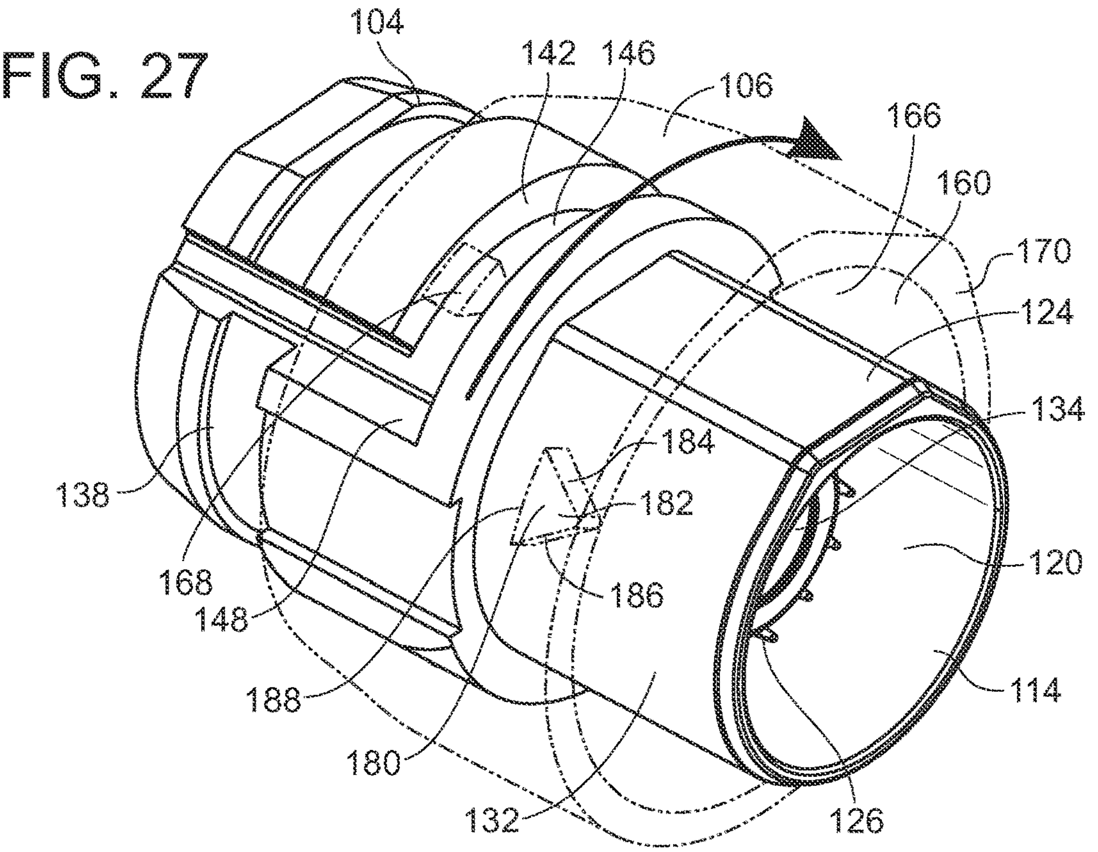
FIG. 27 is a perspective view from a first angle of an assembly of a movable housing component and stationary housing component of a second connector component of a self-locking connector in accordance with an example embodiment with the movable housing component rotated relative to the stationary housing component and illustrated partially transparent to reveal interconnections between the housing components.
Figure 28:
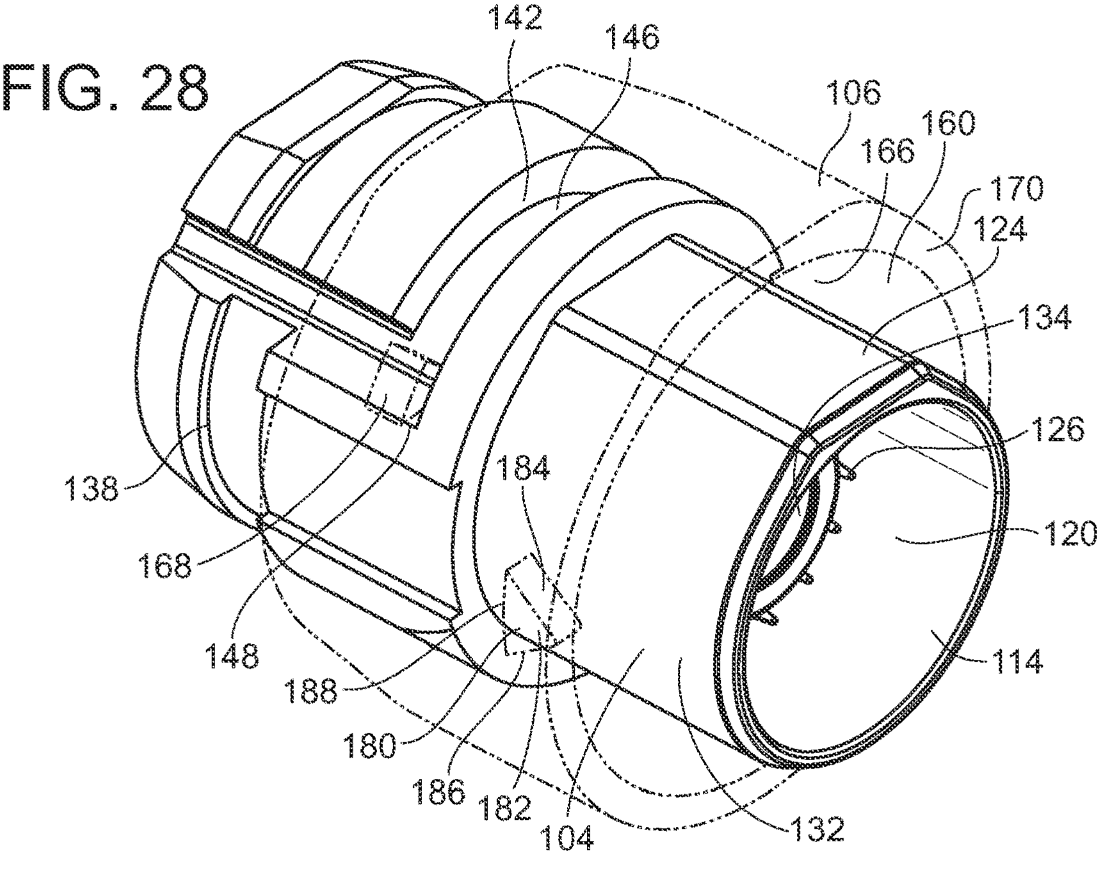
FIG. 28 is a perspective view from a first angle of an assembly of a movable housing component and stationary housing component of a second connector component of a self-locking connector in accordance with an example embodiment with the movable housing connector not rotated relative to the stationary housing component and illustrated partially transparent to reveal interconnections between the housing components.
Figure 29:
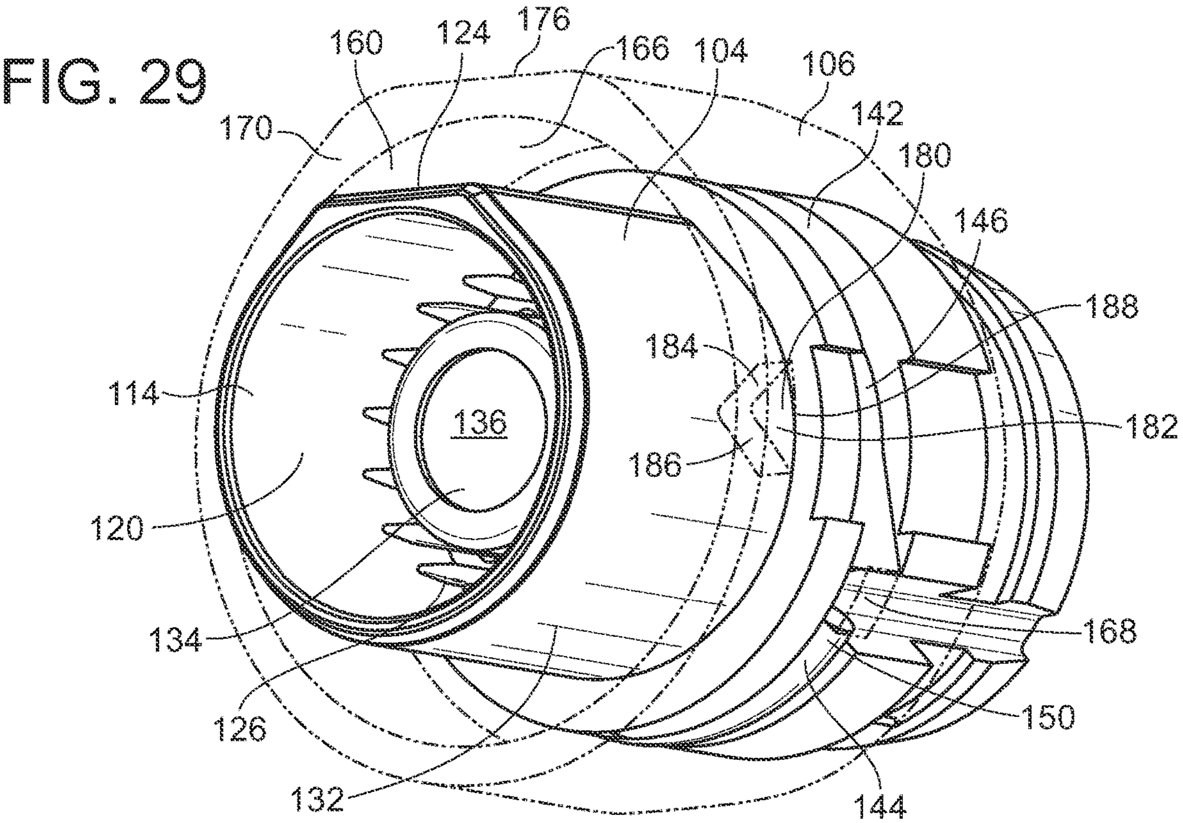
FIG. 29 is a perspective view from a second angle of an assembly of a movable housing component and stationary housing component of a second connector component of a self-locking connector in accordance with an example embodiment with the movable housing component not rotated relative to the stationary housing component and illustrated partially transparent to reveal interconnections between the housing components.
Figure 30:
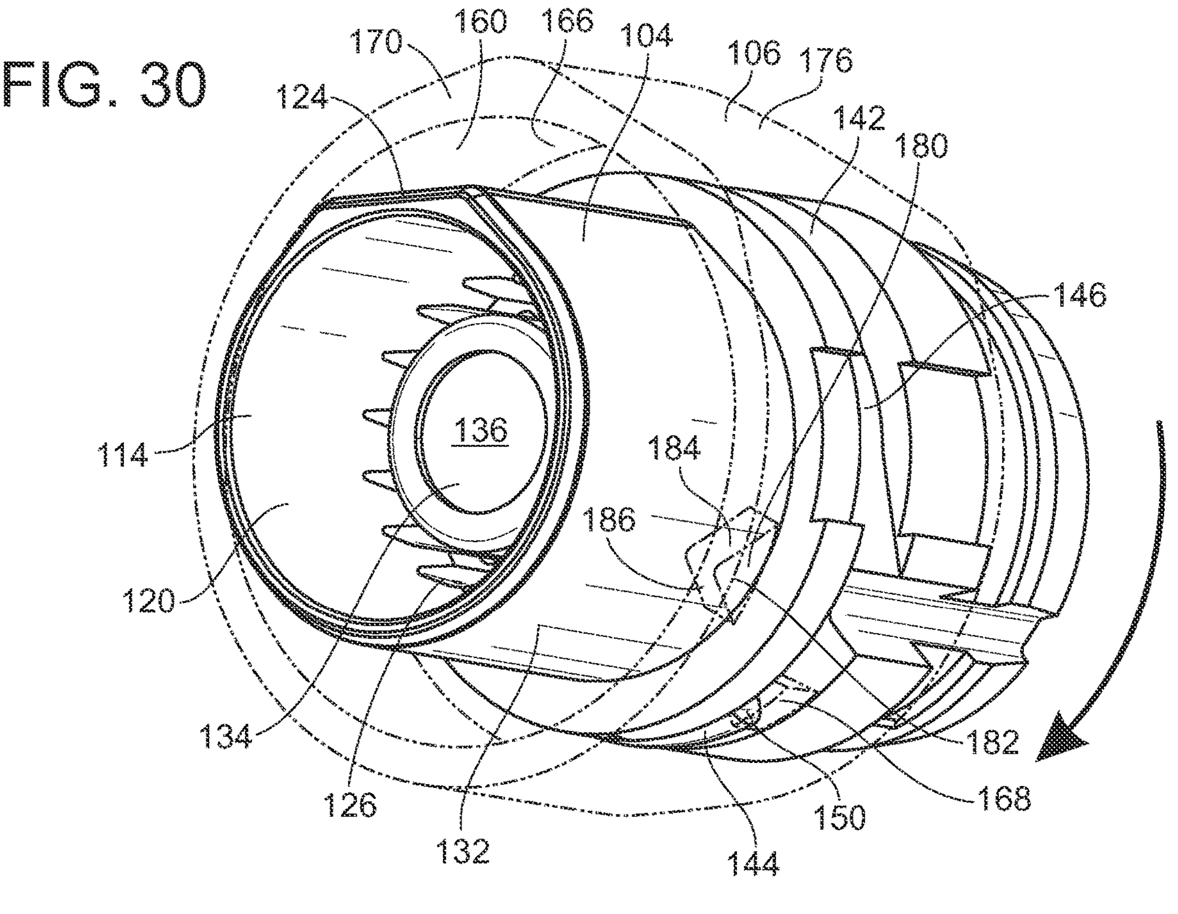
FIG. 30 is a perspective view from a second angle of an assembly of a movable housing component and stationary housing component of a second connector component of a self-locking connector in accordance with an example embodiment with the movable housing component rotated relative to the stationary housing component and illustrated partially transparent to reveal interconnections between the housing components.
Figure 31:
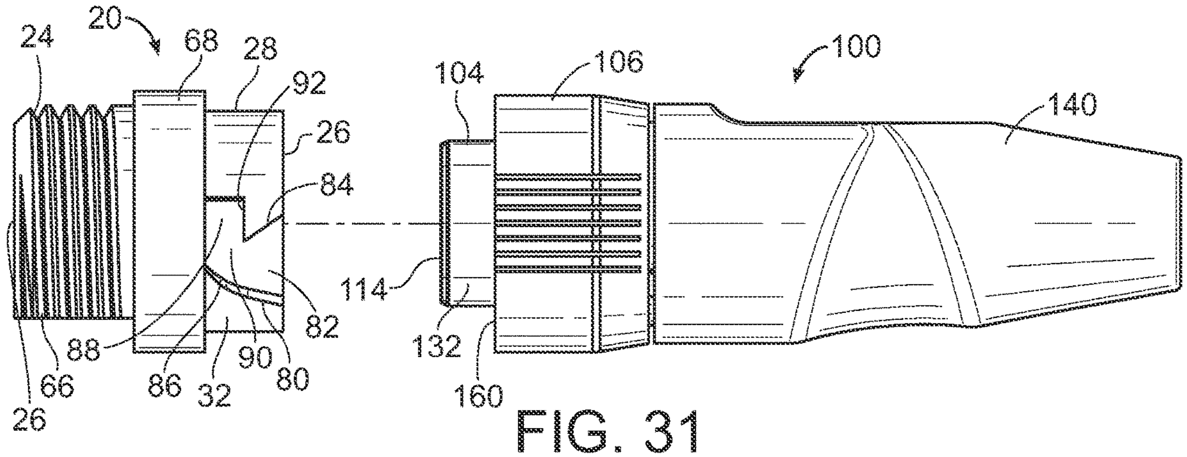
FIG. 31 is a side view of a first connector component and a second connector component of a self-locking connector in a decoupled state in accordance with an example embodiment.
Figure 32:
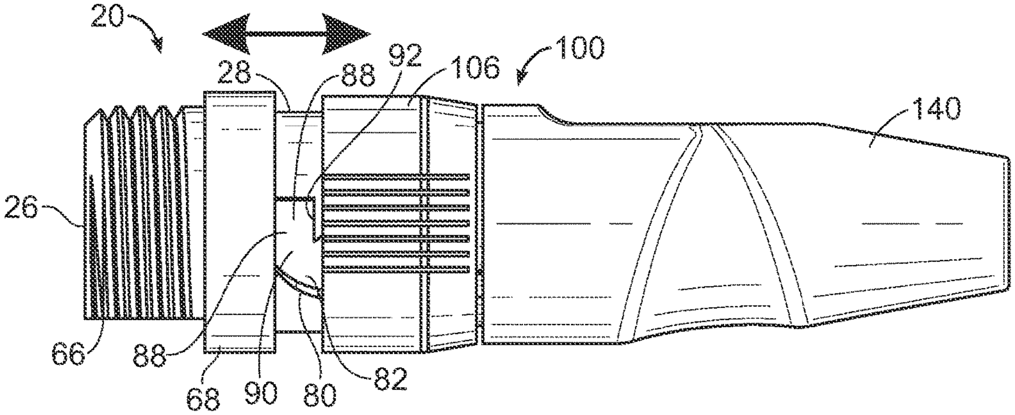
FIG. 32 is a side view of a first connector component and a second connector component of a self-locking connector in the process of being coupled in accordance with an example embodiment.
Figure 33:
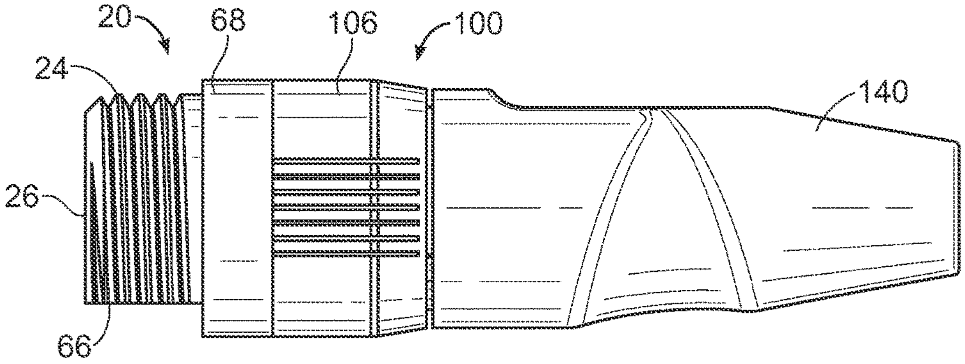
FIG. 33 is a side view of a first connector component and a second connector component of a self-locking connector in a coupled state in accordance with an example embodiment.
Figure 34:
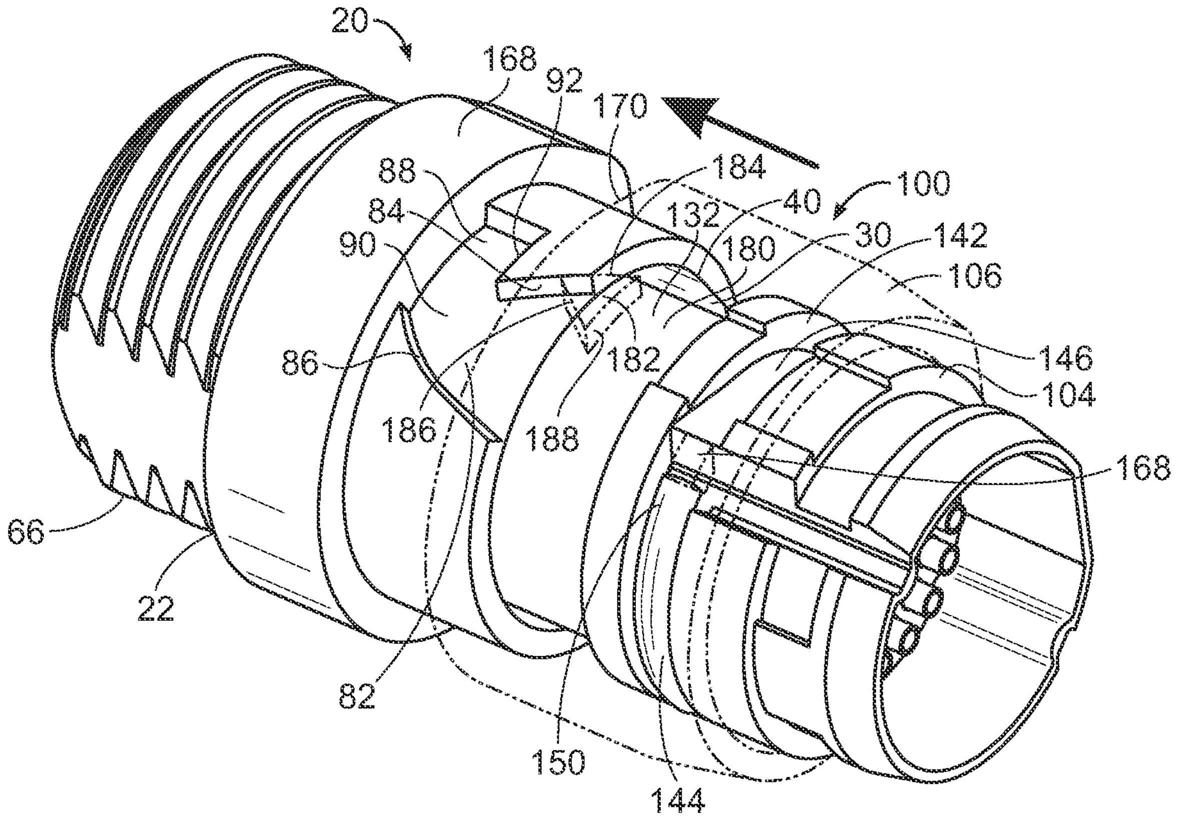
FIG. 34 is a side perspective view of a first connector component and a second connector component of a self-locking connector in the process of being coupled in accordance with an example embodiment with the second connector component illustrated partially transparent to reveal the interaction between first and second lock elements.
Figure 35:
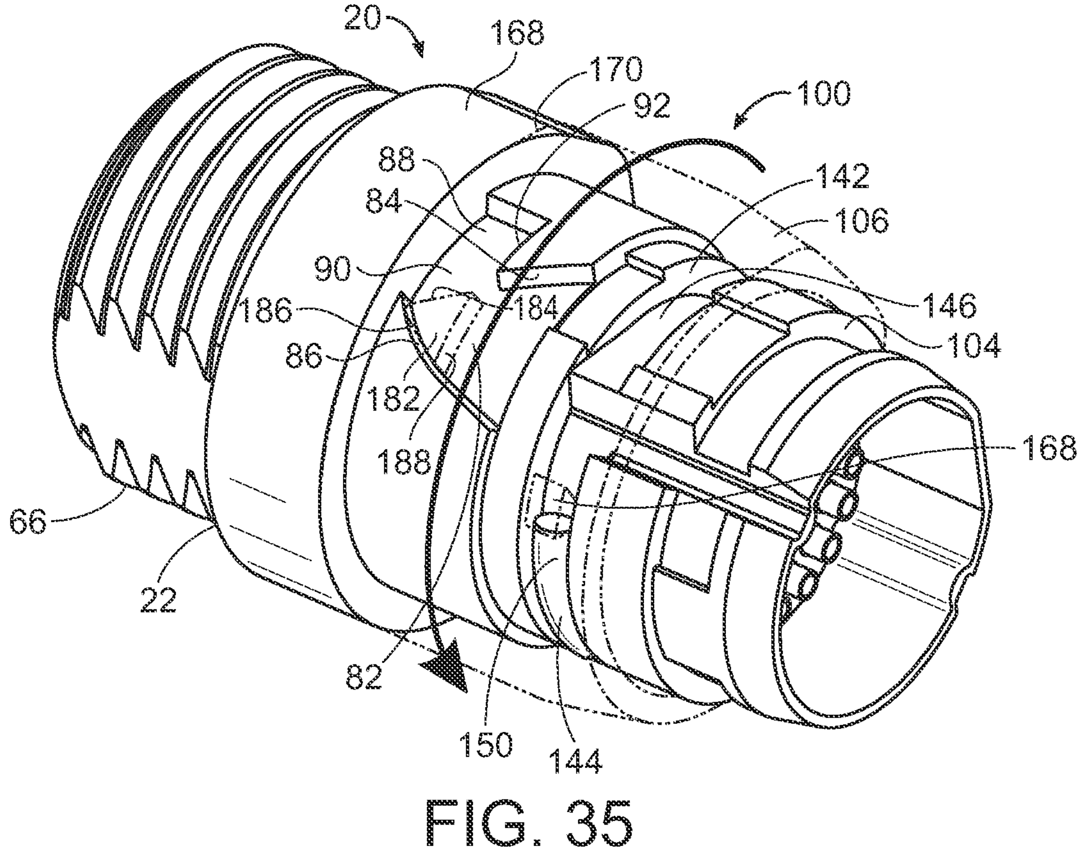
FIG. 35 is another side perspective view of a first connector component and a second connector component of a self-locking connector in the process of being coupled in accordance with an example embodiment with the second connector component illustrated partially transparent to reveal the interaction between first and second lock elements.
Figure 36:
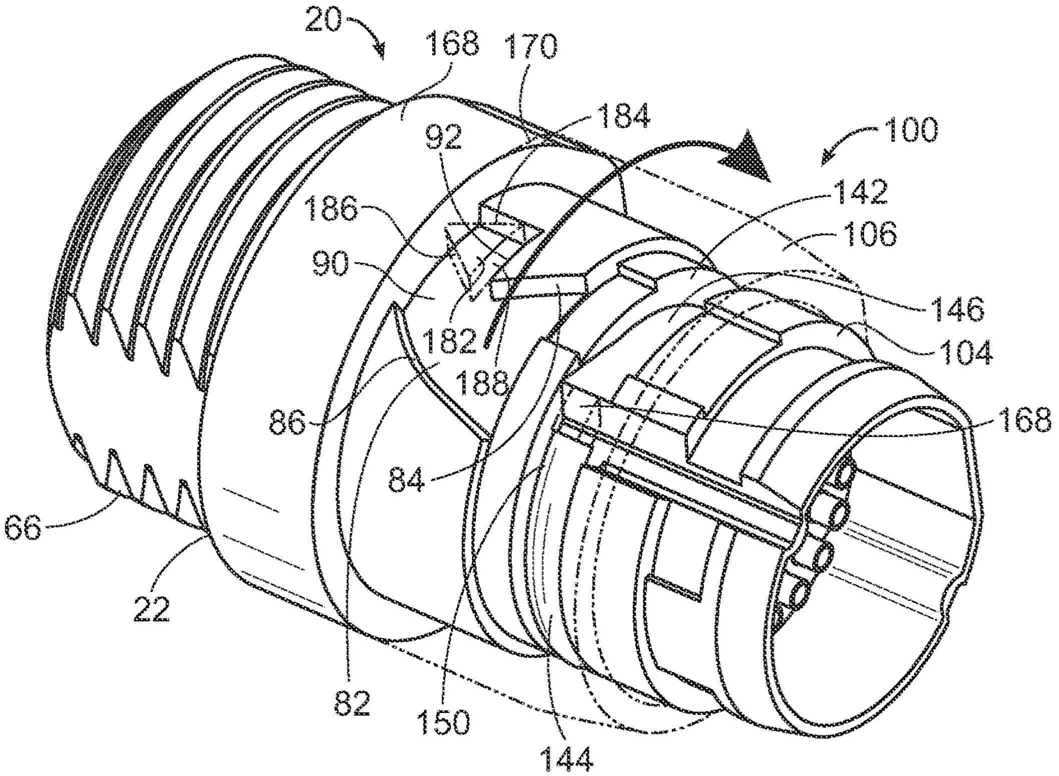
FIG. 36 is another side perspective view of a first connector component and a second connector component of a self-locking connector in a coupled state in accordance with an example embodiment with the second connector component illustrated partially transparent to reveal the interaction between first and second lock elements.
Figure 37:
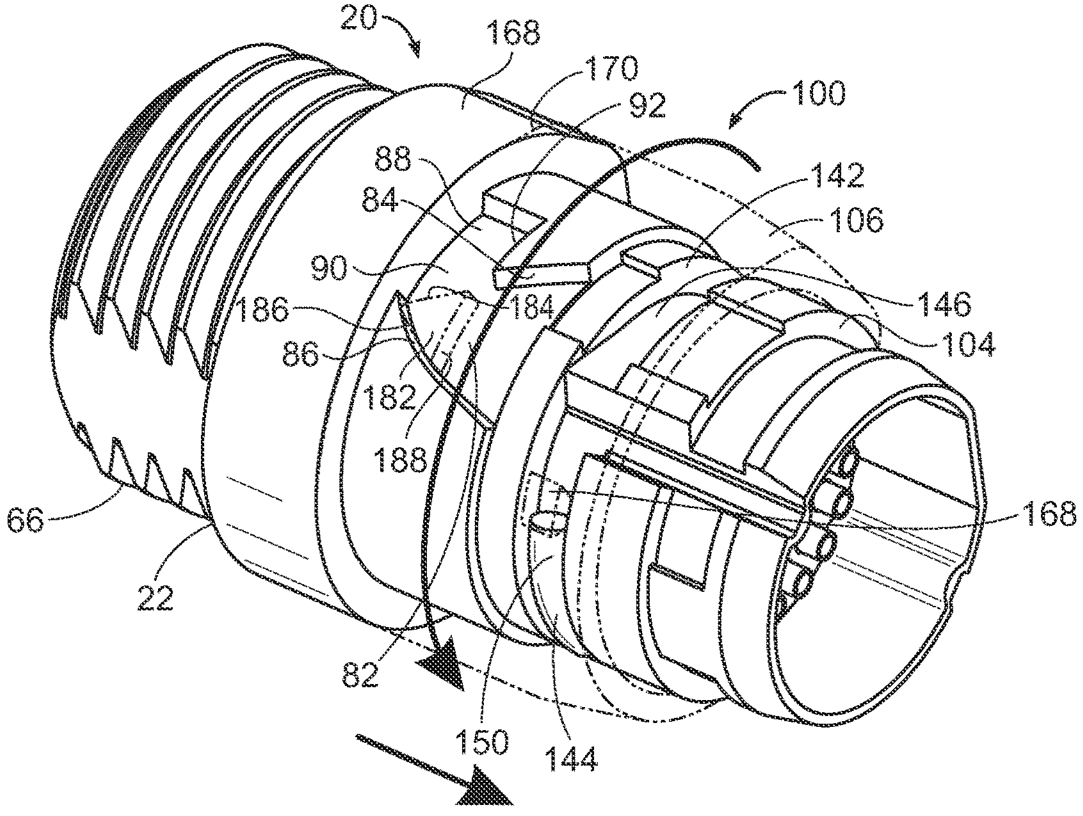
FIG. 37 is a side perspective view of a first connector component and a second connector component of a self-locking connector in the process of being decoupled in accordance with an example embodiment with the second connector component illustrated partially transparent to reveal the interaction between first and second lock elements.

The first connector component 20 of this example embodiment is particularly adapted for use with an example embodiment of the second connector component 100 as illustrated in FIGS. 12-30, in which the corresponding electrically conductive elements 126 comprise elongated electrically conductive protruding pins as best illustrated in FIG. 21. Accordingly, the second end portions 46 of the sockets or receptacles preferably have openings and are adapted to receive and retain the second end portions 130 of the corresponding electrically conductive pins in physical and electrical contact thus completing on or more electrical connections when the first connector component 20 and the second connector component 100 are brought together in the coupled state.

It will be appreciated from the description herein that the electrical connections formed by the electrically conductive elements 42, 126 when the first connector component 20 and the second connector component 100 are put in the coupled state are enclosed within and isolated and protected from the external environment by the nested or interleaved coupled arrangement of the first connector housing 22 and the second connector housing 102 and more particularly the first connector protrusion 48 and the second connector protrusion 132.

3. First Magnetic Element.

As described above, the first magnetic element 62 is adapted with the second magnetic element 134 of the second connector component 100 to generate a force in a direction to urge the first connector component 20 and the second connector component 100 in the coupled state and the first lock element 80 and the second lock element 180 in locked engagement when the first and second connector components 20, 100 are brought together and aligned. Preferably but not necessarily the force comprises an attractive force between the first and second magnetic element 62, 134.

The first magnetic element 62 may be constructed of a magnetic material or a magnetic attractive material such as a ferrous or ferromagnetic metal material. If the first magnetic element 62 comprises magnetic material, it may comprise a permanent magnet, an electromagnet, a rare earth or a similar type of magnet, or any other suitable magnetic material. It will be appreciated that if the first magnetic element 62 comprises a magnetic attractive material, then the second magnetic element 134 should comprise a magnetic material, and vice versa.

It will also be appreciated that if the first magnetic element 62 and the second magnetic element 134 both comprise magnetic material, the magnetic polarities of the two magnetic elements 62, 134 generally and preferably will be oriented so that the magnetic force is an attractive force. However, it is not always necessary that the force comprise an attractive force and persons skilled in the art will envision variations in which an opposing force may be translated via linkage structure or otherwise into a motion or force that urges the first connector component 20 and the second connector component 100 in the coupled state and the first lock element 80 and the second lock element 180 in locked engagement.

In one example embodiment, the first magnetic element 62 may comprise an elongated, substantially cylindrically-shaped magnet with a substantially flat first magnetic surface 64. However, the first magnetic element 62 and the first magnetic surface 64 may be formed in any shape that is suitable for use in the first connector component 20 and consistent with the purposes and functions described herein.

The shape, size, and disposition of the first magnetic element 62 and the first magnetic surface 64 are preferably selected so that with the second magnetic element 134 and second magnetic surface 136 a magnetic force is produced with sufficient strength to urge the first connector component 20 and the second connector component 100 in the coupled state and the first lock element 80 and the second lock element 180 in the locked engagement state automatically as described herein. Further, the magnetic elements 62, 134 are preferably selected to bring the first and second connector components 20, 100 together with sufficient force to provide an audible "click" or other feedback to an operator or user as the first and second connector components 20, 100 enter the coupled state. However, the strength should not substantially hinder manually bringing the first lock element 80 and the second lock element 180 from locked engagement or brining the first and second connector elements 20, 100 out of the coupled state as described herein. For example, in many medical applications a magnetic force of approximately two pounds should be suitable. Generally, it is preferred to employ the minimum magnetic force required for a particular intended application in order to avoid potential magnetic interference with electrical signals that may be transiting the self-locking connector 10.

It will be appreciated from the description herein that when the first connector component 20 and the second connector component 100 are put in the coupled state the first and second magnetic elements 62, 134 and first and second magnetic surfaces 64, 136 are enclosed within and isolated and protected from the external environment by the nested or interleaved coupled arrangement of the first connector housing 22 and the second connector housing 102 and more particularly the first connector protrusion 48 and the second connector protrusion 132. It will also be appreciated that the first magnetic element 62 and the first magnetic surface 64 are protected from potential damage from the external environment by being recessed within the first connector housing 22 even when the first connector element 20 is not in the coupled state with the second connector element 100.

4. First Lock Element.

As described above, the first lock element 80 may be provided on and/or in the exterior surface 32 of the first connector housing 22, and may comprise one or a plurality of spaced-apart lock elements 80. Also as described above, the first lock element 80 is arranged and configured to be aligned with the corresponding second lock element 180 of the second connector component 100 when the first connector component 20 and the second connector component 100 are brought into alignment to be put in the coupled state.

The first lock element 80 is adapted to be brought into locked engagement with the second lock element 180 automatically when the first connector component 20 and the second connector component 100 are put in the coupled state without any operator or user intervention other than to bring the first connector component 20 and the second connector component 100 together. In contrast, the first lock element 80 is adapted to be brought out of locked engagement with the second lock element 180 manually to enable the first connector component 20 and the second connector component 100 to be brought out of the coupled state.

As described in further detail below, the second lock element 180 may be disposed on a movable housing component 106 of the second connector housing 102 of the second connector 100, and the movable housing component 106 may be rotatable or otherwise movable relative to the first connector housing 22 and thus the first lock element 80. Thus, insofar as the locking functionality is concerned the second lock element 180 may be rotatable or otherwise movable relative to the first lock element 80 to bring the first and second lock elements 80, 180 in and out of locked engagement. More specifically, the second lock element 180 may be rotatable or otherwise movable in a first direction relative to the first lock element 80 to bring the first and second lock elements 80, 180 in locked engagement and in a second direction to bring the first and second lock elements 80, 180 out of locked engagement.

Further, the second lock element 180 may be automatically rotatable or otherwise movable in a first direction relative to the first lock element 80 when the first connector component 20 and the second connector component 100 are brought into the coupled state to automatically bring the first and second lock elements 80, 180 in locked engagement without any operator or user intervention other than to bring the first connector component 20 and the second connector component 100 together. Still further, the second lock element 180 may be manually rotatable or otherwise movable in a second direction relative to the first lock element 80 to bring the first lock element 80 and the second lock element 180 out of locked engagement.

In one example embodiment, two first lock elements 80 are disposed on the exterior surface 32 of the first connector housing 22 of the first connector component 20. It will be appreciated however, that only one or more than two first lock elements 80 may be employed as desired. The two first lock elements 80 may be spaced apart around the second end opening 30 radially and equidistant or otherwise as desired provided they are arranged and spaced to align with corresponding second lock elements 180 of the second connector component 100 when the first and second connector components 20, 100 are aligned to be put in the coupled state. In one example embodiment, the two first lock elements 80 may be spaced apart on opposite sides of the second end opening 30 by approximately 180 degrees.

The first lock elements 80 may be identical, however it will be appreciated that they need not be identical. However, since in the example embodiment illustrated they are identical, only one will be further described below and that description is intended to apply equally to the other.

The first lock element 80 may comprise a lock receptacle 82. The lock receptacle 82 is adapted to receive and retain a corresponding lock protrusion 182 of the second lock element 180 to put and maintain the first lock element 80 and the second lock element 180 in locked engagement. The lock receptacle 82 may comprise an elongated slot 88 inset in the exterior surface 32 of the first connector housing 22 and recessed from the second end opening 30. The slot 88 may have an opening 90 for receiving the corresponding lock protrusion 182 and a surface 92 for blocking movement of the corresponding lock protrusion 182 and hence the second connector component 100 in a direction to enable the first connector component 20 to be decoupled from the second connector component 100.

In this example embodiment, at least insofar as the locking functionality is concerned the first lock element 80 is stationary relative to the second lock element 180, and the second lock element 180 is preferably rotatable or otherwise movable relative to the first lock element 80 to bring the first lock element 80 and the second lock element 180 in and out of locked engagement. The second lock element 180 may be disposed on the movable housing component 106 of the second connector housing 102 of the second connector component 100 and the movable housing component 106 may be rotatable or otherwise movable relative to the first connector housing 22 and the first lock element 80 bring the second lock element into and out of locked engagement with the first lock element 80.

The slot 88 and opening 90 of the lock receptacle 82 may be arranged and oriented so that the lock protrusion 182 of the second lock element 180 must be rotated or otherwise moved at an angle with respect to the direction of motion required to bring the first and second connector components 20, 100 into and out of the coupled state in order to enter and exit the opening 90 and the slot 88 and bring the first lock element 80 and the second lock element 180 in and out of locked engagement. In the example embodiment illustrated, the angle is substantially perpendicular to the direction of motion required to couple and decouple the first connector component 20 and the second connector component 100. Accordingly, the second lock element 180 and the lock protrusion 182 must be rotated or otherwise moved substantially perpendicularly to the direction of motion required to bring the first and second connector components 20, 100 in and out of the coupled state to bring the lock protrusion 182 into and out of the opening 90 and slot 88 of the first lock element 80 to bring the first lock element 80 and the second lock element 180 in and out of locked engagement.

It will be appreciated that the slot 88 and opening 90 may have various shapes, arrangements and orientations, and that the lock receptacle 82 may comprise structures other than slot 88 and opening 90 consistent with accomplishing the functions and purposes of the lock receptacle 82 described herein. It will also be appreciated that the lock receptacle 82 may be formed on the exterior surface 32 and may include various protrusion features as well as inset features, consistent again with the functions and purposes of the lock receptacle 82 described herein.

The first lock element 80 may comprise one or more engagement surfaces. The one or more engagement surfaces are arranged, configured, and adapted for relative movable engagement with one or more corresponding engagement surfaces of the second lock element 180 in a first direction to bring the first lock element 80 and the second lock element 180 in locked engagement. The one or more engagement surfaces are arranged, configured, and adapted for relative movable engagement with the one or more corresponding engagement surfaces of the second lock element 180 in a second direction to bring the first lock element 80 and the second lock element 180 out of locked engagement.

More specifically, the one or more engagement surfaces are adapted for relative movable engagement with the one or more corresponding engagement surfaces of the second lock element 180 in the first direction automatically as the first and second connector components 20, 100 are brought together and put in the coupled state to automatically cause the second lock element 180 to rotate or otherwise move in a first direction relative to the first lock element 80 to automatically bring the first and second lock elements 80, 180 in locked engagement. The one or more engagement surfaces are adapted for relative movable engagement with the one or more corresponding engagement surfaces of the second lock element 180 in the second direction in response to manual manipulation to manually cause the second lock element 180 to rotate or otherwise move in the second direction relative to the first lock element 80 to manually bring the first and second lock elements 80, 180 out of locked engagement.

Still more specifically, the one or more engagement surfaces are adapted for relative movable engagement with the one or more corresponding engagement surfaces of the second lock element 180 in the first direction automatically as the first and second connector components 20, 100 are brought together and put in the coupled state to automatically cause the lock protrusion 182 of the second lock element 180 to rotate or otherwise move in the first direction relative to the lock receptacle 82, e.g., the slot 88 and opening 90, automatically bring the lock protrusion 182 into the lock receptacle 82, and automatically bring the first and second lock elements 80, 180 in locked engagement. The one or more engagement surfaces are adapted for relative movable engagement with the one or more corresponding engagement surfaces of the second lock element 180 in the second direction in response to manual manipulation to manually cause the lock protrusion 182 of the second lock element 180 to rotate or otherwise move in the second direction relative to the lock receptacle 82, manually bring the lock protrusion 182 out of the lock receptacle 82, and manually bring the first and second lock elements 80, 180 out of locked engagement.

In one example embodiment, the first lock element 80 comprises a first engagement surface 84 and a second engagement surface 86. The first engagement surface 84 is configured and adapted for relative movable engagement with a corresponding first engagement surface 184 of the lock protrusion 182 when the first connector component 20 and the second connector component 100 are brought together in the coupled state. The second engagement surface 86 is configured and adapted for relative movable engagement with a corresponding second engagement surface 186 of the lock protrusion 182 when the first connector component 20 and the second connector component 100 are brought together in the coupled state.

The first engagement surface 84 is movably engaged by the corresponding first engagement surface 184 to bring the lock protrusion 182 into alignment with the lock receptacle 82, and more specifically the opening 90 and slot 88 of the lock receptacle 82. The first engagement surface 84 may be adjacent or in proximity to the opening 90. The first engagement surface 84 may comprise an angled surface that is adapted to guide and direct the lock protrusion 182 around the surface 92 and into alignment with the opening 90. As the first and second connector components 20, 100 are brought together, the corresponding first engagement surface 184 of the lock protrusion 182 automatically engages and moves along the first engagement surface 84. This causes the lock protrusion 182 to automatically rotate relative to the first lock element 80, around the surface 92, and into engagement with the second engagement surface 86.

The second engagement surface 86 is movably engaged by the corresponding second engagement surface 186 to guide and direct the lock protrusion 182 into the lock receptacle 82 to bring the first lock element 80 and the second lock element 180 into locked engagement. More specifically, the second engagement surface 86 is adapted to guide and direct the lock protrusion 182 in the first direction through the opening 90 and into the slot 88 of the lock receptacle 82. The second engagement surface 86 may be adjacent or in proximity to the opening 90. The second engagement surface 86 may comprise an angled or curved surface that is adapted to guide and direct the lock protrusion 182 in the first direction through the opening 90 and into the slot 88 of the lock receptacle 82. As the first and second connector components 20, 100 are further brought together, the corresponding second engagement surface 186 of the lock protrusion 182 automatically engages and moves along the second engagement surface 84. This causes the lock protrusion 182 to automatically rotate relative to the first lock element 80 in the first direction, move through the opening 90 and into the slot 88 of the lock receptacle 82, and automatically bring the first and second lock elements 80, 180 into locked engagement without any other intervention by an operator or user.

The first and second lock elements 80, 180 also may be urged in locked engagement by a biasing means such as a spring 144, which may be coupled to the first lock element 80 or to the second lock element 180, as described below. The spring 144 may be arranged to urge the second lock element 180 to rotate or otherwise move in the first direction relative to the first lock element 80 to bring the first and second lock elements 80, 180 into locked engagement, and to oppose the second lock element 180 rotating or otherwise moving in the second direction to bring the first and second lock elements 80, 180 out of locked engagement.

It will be appreciated that the use of a biasing means, such as spring 144, may further assist the automatic locking functionality of the self-locking connector 10 by urging the second lock element 180 toward the locked engagement position with the first lock element 80 without any manual intervention or assistance by an operator or user. It will also be appreciated that the spring 144 may help provide tactile and/or visual feedback to the operator or user that the first and second lock elements 80, 180 are in secure locked engagement by forcefully urging the lock protrusion 182 into the lock receptacle 82 and by causing the movable housing component 106 to rotate or otherwise move back to its original position with the first and second connector alignment marks 70, 172 aligned. It will also be appreciated that the spring 144 may further assist in making the locked engagement more secure by opposing rotation or other movement of the second lock element 180 relative to the first lock element 80 in the second direction to bring the first and second lock elements 80, 180 out of locked engagement.

The first and second engagement surfaces 84, 86 are also configured and adapted to be relatively movably engaged by the corresponding first and second engagement surfaces 184, 186 respectively of the lock protrusion 182 in response to manual manipulation of an operator or user to manually bring the first and second lock elements 80, 180 out of locked engagement and to bring the first and second connector components 20, 100 out of the coupled state and into a decoupled state. The manner in which this is accomplished is essentially the reverse of bringing the first and second connector components 20, 100 together into the coupled state and the first and second lock components 80, 180 into locked engagement as described above.

First, the operator or user manually rotates or otherwise moves the movable housing 106 in the second direction. This causes the second lock element 180 and more specifically the lock protrusion 182 to rotate or otherwise move in the second direction relative to the first lock element 80 and more specifically the lock receptacle 82. If a spring 144 or other biasing means is present and urging the second lock element 180 in the first direction toward locked engagement, sufficient force must be applied manually to overcome the force of the spring 144. The manual rotation or other movement of the second lock element 180 in the second direction causes the lock protrusion 182 to move in the second direction and exit the lock receptacle 82 through the opening 90 in the slot 88. With the lock protrusion 182 clear of the surface 92 of the lock receptacle 82, the second corresponding engagement surface 186 of the lock protrusion 182 comes into engagement with the second engagement surface 86 of the first lock element 80. The first connector component 20 and the second connector component 100 are then separated. If the spring 144 or other biasing means is present, the second lock element 180 is held with the second corresponding engagement surface 186 in engagement with the second engagement surface 86 of the first lock element 80 as the first and second connector components 20, 100 begin to be separated. The second corresponding engagement surface 186 moves along the second engagement surface 86 until it is out of alignment with the opening 90 of the lock receptacle 82. This brings the first and second lock elements 80, 180 out of locked engagement. As the first and second connector components 20, 100 continue to be separated, the second lock element 180 may be released and allowed to rotate in the second direction until the corresponding first engagement surface 184 of the lock protrusion 182 comes into engagement with the angled surface of the first engagement surface 84 of the first lock element 80. As the first and second connector components 20, 100 are further separated, the corresponding first engagement surface 184 of the lock protrusion 182 engages and moves along the angled surface of the first engagement surface 84 and the second lock element 180 continues to rotate in the second direction until it returns to its pre-coupled, pre-locked engagement position and the first and second connector components 20, 100 are out of contact and out of the coupled state.

While the foregoing description is given with first lock element 80 being disposed on the first connector component 20 and the second lock element 180 being disposed on the second connector component 100, it will be appreciated that the first lock element 80 and the second lock element 180 may be exchanged. In other words, the first lock element 80 may be disposed on the second connector component 100 in place of the second lock element 180, and the second lock element 180 may be disposed on the first connector component 20 in place of the first lock element 80 without changing the functionality of the example embodiments of the self-locking connector 10.

C. Second Connector Component

An example embodiment of the second connector component 100 is described with reference primarily to FIGS. 12-30. The second connector component 100 generally comprises a second connector housing 102, one or more electrically conductive elements 126, a second magnetic element 134, and a second lock element 180.

1. Second Connector Housing.

The second connector component 100 comprises a second connector housing 102 having a stationary housing component 104 and a movable housing component 106. The stationary housing component 104 and the movable housing component 106 may be constructed of the same or similar materials and using the same or similar processes as described with respect to the first connector housing 22.

2. Stationary and Movable Housing Components.

The stationary housing component 104 and the movable housing component 106 each may comprise an elongated substantially cylindrical structure with a substantially circular cross-sectional shape. Alternatively, the stationary and movable housing components 104, 106 may be constructed to have any other cross-sectional shape desired, including but not limited to a polygonal shape, an elliptical shape, or any other geometric shape. The stationary and movable housing components 104, 106 each can have a longitudinal axis and can be arranged to be concentric or otherwise co-axial. The shapes of the stationary and movable housing components 104, 106 need not be exactly the same and need not be exactly the same as the shape of the first connector housing 22. However, the shapes should be compatible with each other and with the first connector housing 22 so that the stationary and movable housing components 104, 106 can be coupled together as described herein, and so that the first connector housing 22 and the second connector housing 102 can be selectively coupled and decoupled to bring the first and second connector components 20, 100 into and out of the coupled state as described herein.

The movable housing component 106 and the stationary housing component 104 are preferably arranged and configured with the movable housing component 106 disposed around, substantially surrounding, and at least partially enclosing at least a portion of the stationary housing component 104 as further described below.

The movable housing component 106 is adapted to be rotatably or otherwise movably coupled with the stationary housing component 104. The movable housing component 106 is also adapted to be rotatably or otherwise movably coupled with the first connector housing 22 of the first connector component 20 as described above and further below. The stationary housing component 104 is adapted to be selectively coupled in a stationary fashion with the first connector housing 22 as described above and further below.

The stationary housing component 104 has a first end 108 with a first end opening 110, a second end 112 with a second end opening 114, an exterior surface 116, an interior surface 118, and an interior space 120. The first end 108 corresponds to a first end of the second connector housing 102 and the second end 112 corresponds with a second end of the second connector housing 102.

The first end opening 110 exposes the interior space 120. The first end opening 110 may have a substantially circular shape or any other suitable geometric shape. The first end opening 110 is adapted to receive the first ends of a plurality of wires, pins or other electrical conductors adapted to conduct electrical signals and/or power. The electrical conductors may comprise or be carried by an electrical cable, or a fitting such as a socket, and may be separate individual elements. The opposite second ends of the electrical conductors may be adapted to be connected to a source of electrical signals and/or power, a piece of equipment or a device that sinks electrical power and/or signals, another electrical connector or fitting adapted to be connected to yet another cable, source, or piece of equipment, or to an intermediate device, such as a switch or multiplexer.

Figure 14:
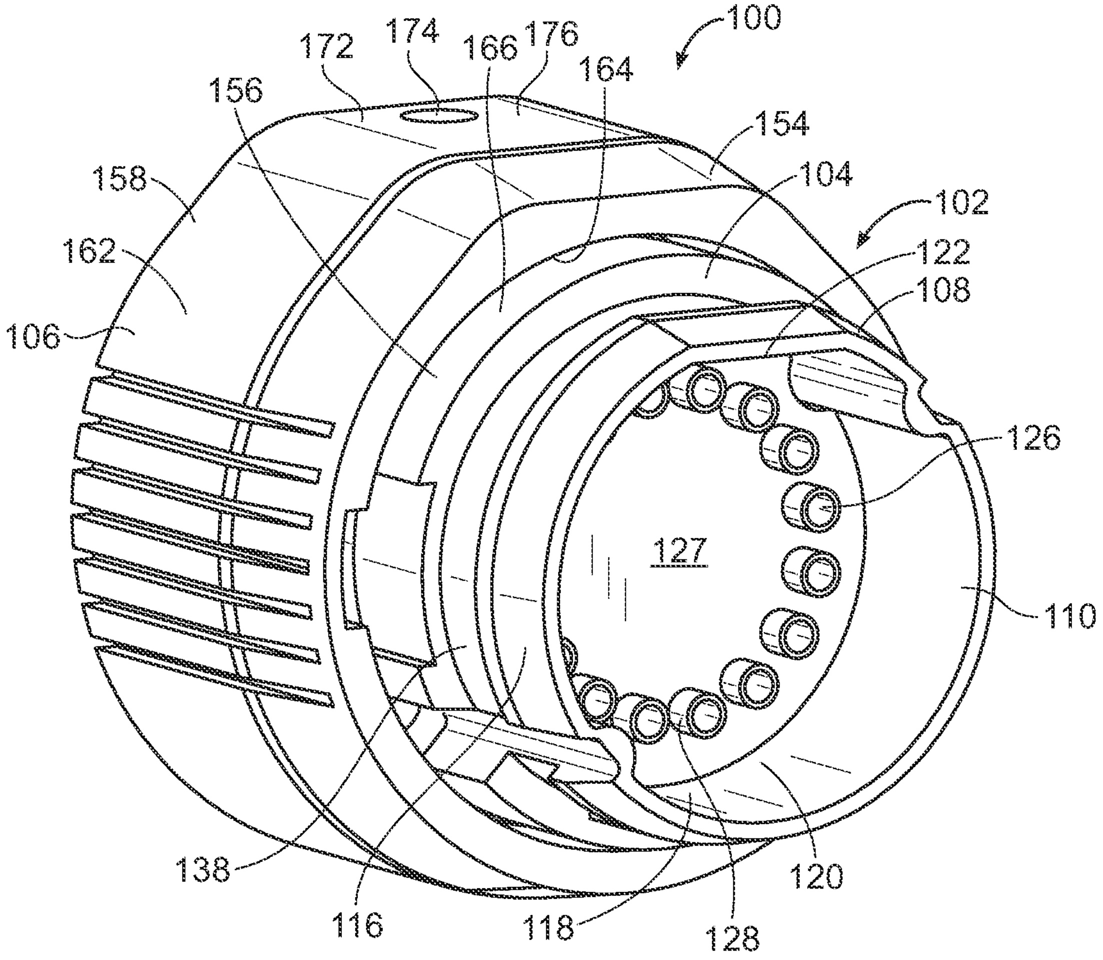
FIG. 14 is a perspective view of a second end of a second connector component of a self-locking connector in accordance with an example embodiment.
Figure 15:
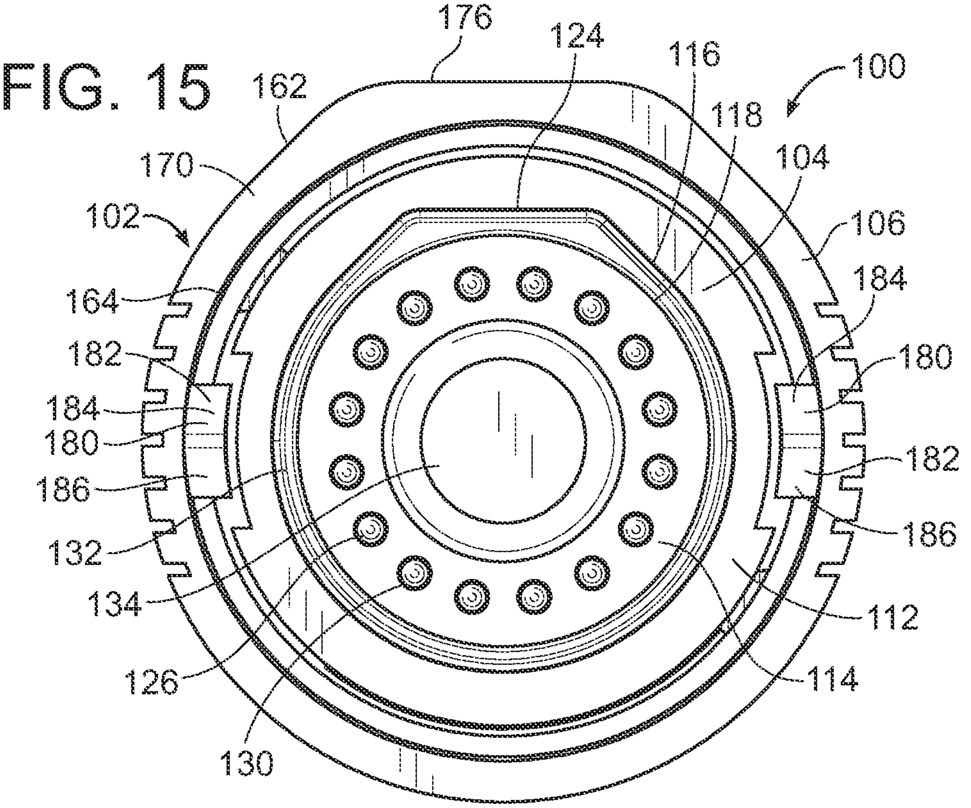
FIG. 15 is an end view of a first end of a second connector component of a self-locking connector in accordance with an example embodiment.
Figure 16:
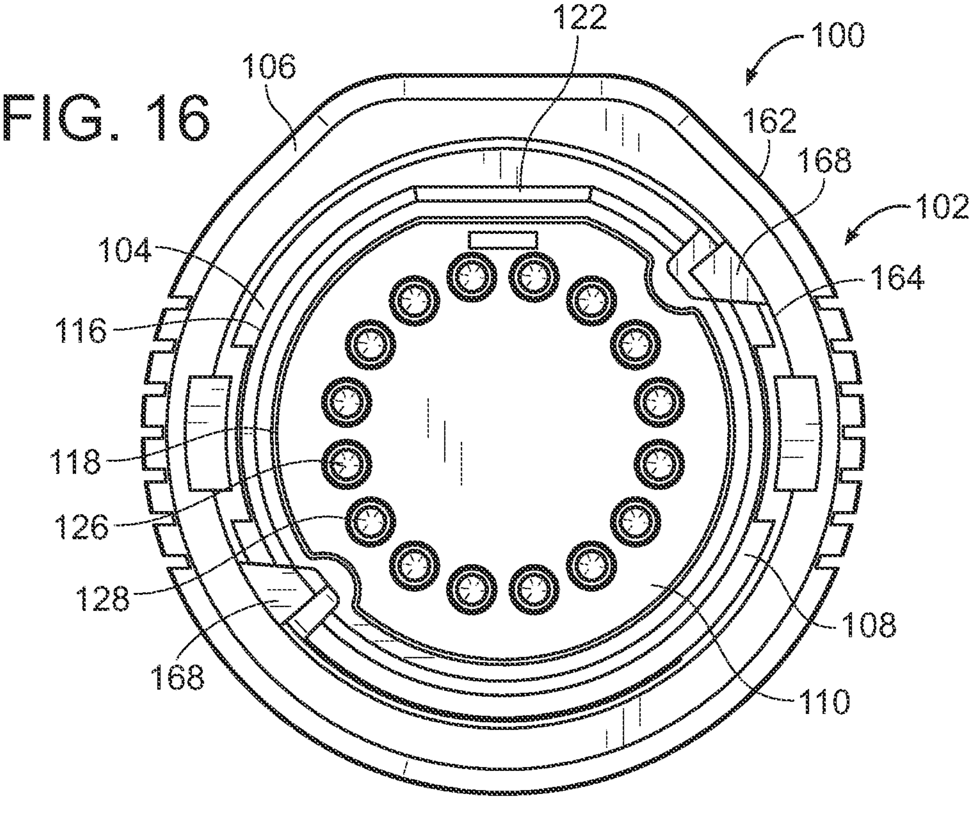
FIG. 16 is an end view of a second end of a second connector component of a self-locking connector in accordance with an example embodiment.
Figure 17:
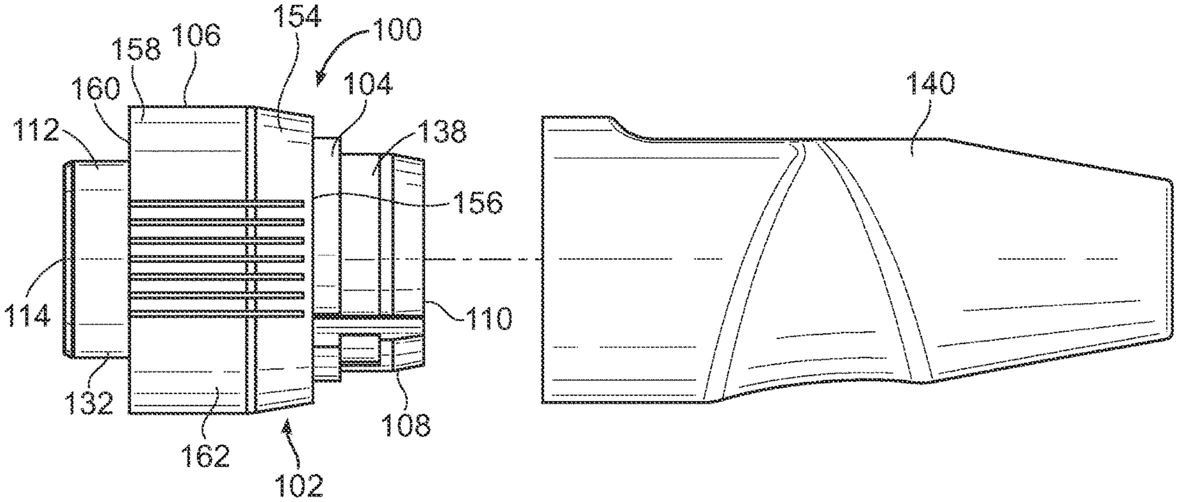
FIG. 17 is a side view of a first side of a second connector component of a self-locking connector in accordance with an example embodiment.
Figure 18:
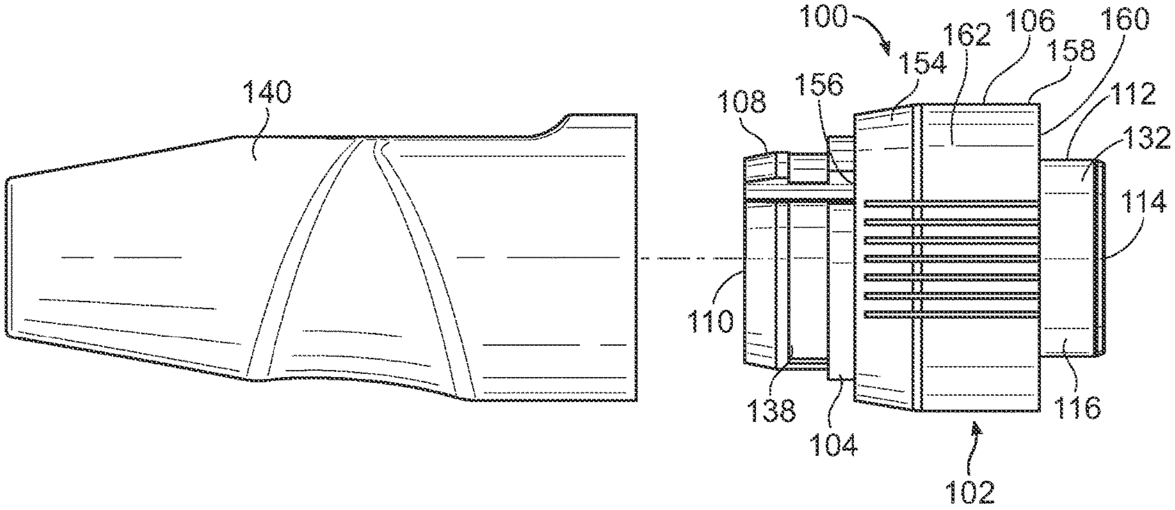
FIG. 18 is a side view of a second side of a second connector component of a self-locking connector in accordance with an example embodiment.
Figure 19:
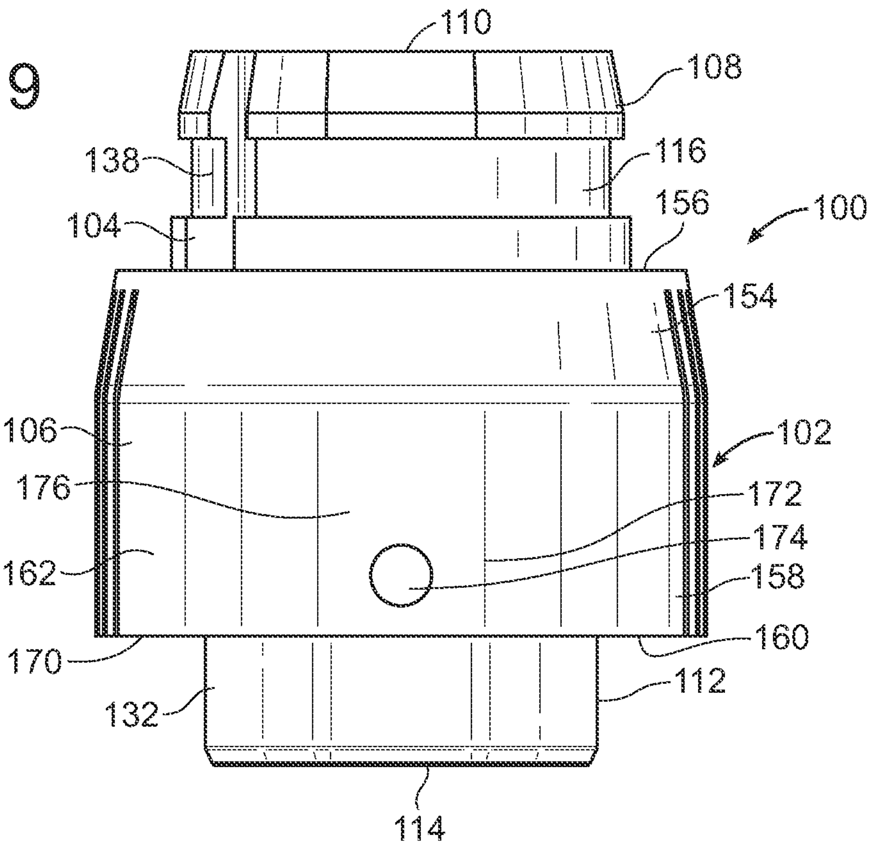
FIG. 19 is a top view of a second connector component of a self-locking connector in accordance with an example embodiment.
Figure 20:
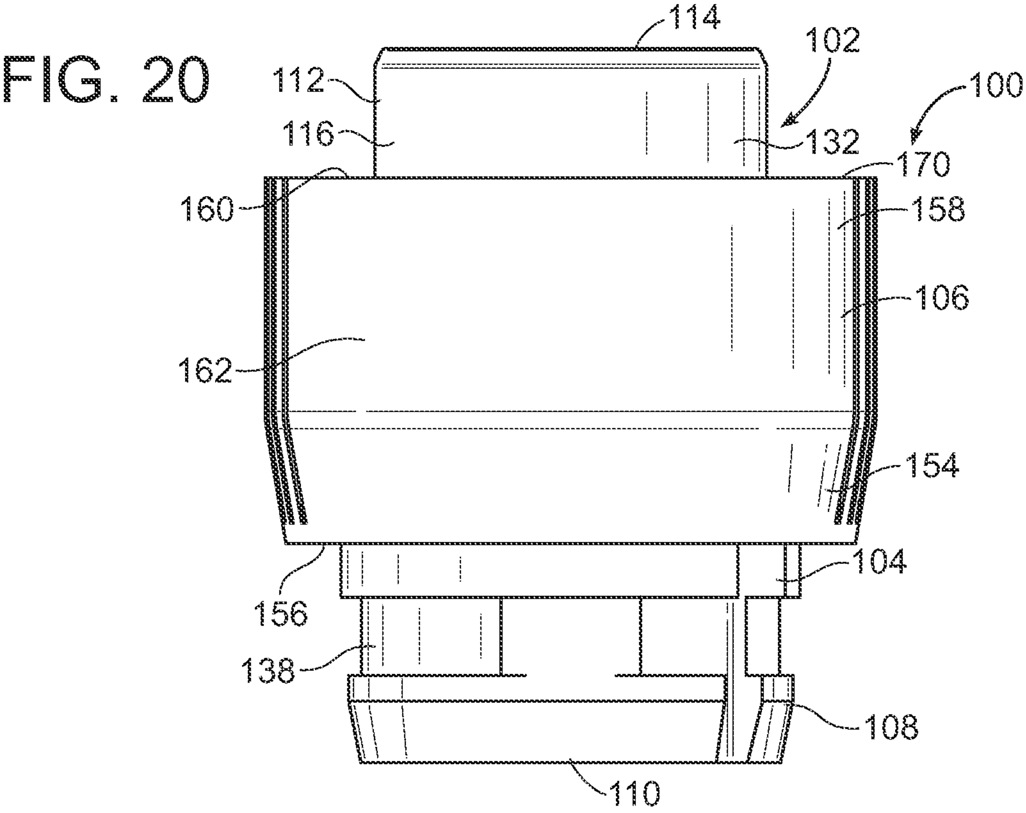
FIG. 20 is a bottom view of a second connector component of a self-locking connector in accordance with an example embodiment.

The first end opening 110 may comprise a first end opening key 122. The first end opening key 122 may comprise a flat as illustrated in FIGS. 14, 16, and others. The first end opening key 122 also may comprise one or more flats, indents, or protrusions, or a combination thereof, for example. The first end opening key 122 may be formed in or located on or adjacent to a periphery of the first end opening 110 or at another location. The first end opening key 122 is adapted to enable the first end opening 110 to receive an end of a cable, socket, electrical connector, fitting, or the like in only a predetermined orientation or orientations, and to prevent reception in any other orientation.

The one or more electrically conductive elements 126 are disposed within the interior space 120. A first end portion 128 of each electrically conductive element 126 is exposed to and accessible through the first end opening 110 and a second end portion 130 is exposed to and accessible through the second end opening 114. The first end portions 128 are recessed from the first end opening 110 within the interior space 120 and the second end portions 130 are recessed from the second end opening 114 within the interior space 120. The electrically conductive elements 126 may be spaced apart and arranged within the interior space 120. For example, the stationary housing component 104 can have a longitudinal axis, and the electrically conductive elements 126 can be spaced apart in a radial arrangement around the longitudinal axis. Preferably the spacing and arrangement of the electrically conductive elements 126 corresponds with the spacing and arrangement of the electrically conductive elements 42 of the first connector component 20.

The electrically conductive elements 126 may be disposed and retained within the interior space 120 by any suitable means, e.g., a press fit with the interior surface 118 and/or a suitable adhesive. Alternatively or in addition, a common base 127 of the electrically conductive elements 126 can be press fit or adhered to the interior surface 118 preferably at or near the first end 108.

The second end opening 114 exposes the interior space 120. The second end opening 114 may have a substantially circular shape or any other suitable geometric shape. The second end opening 114 is adapted and configured to receive the first connector protrusion 48 of the first connector housing 22 of the first connector component 20 for the first and second connector components 20, 100 to be put in the coupled state.

Figure 12:
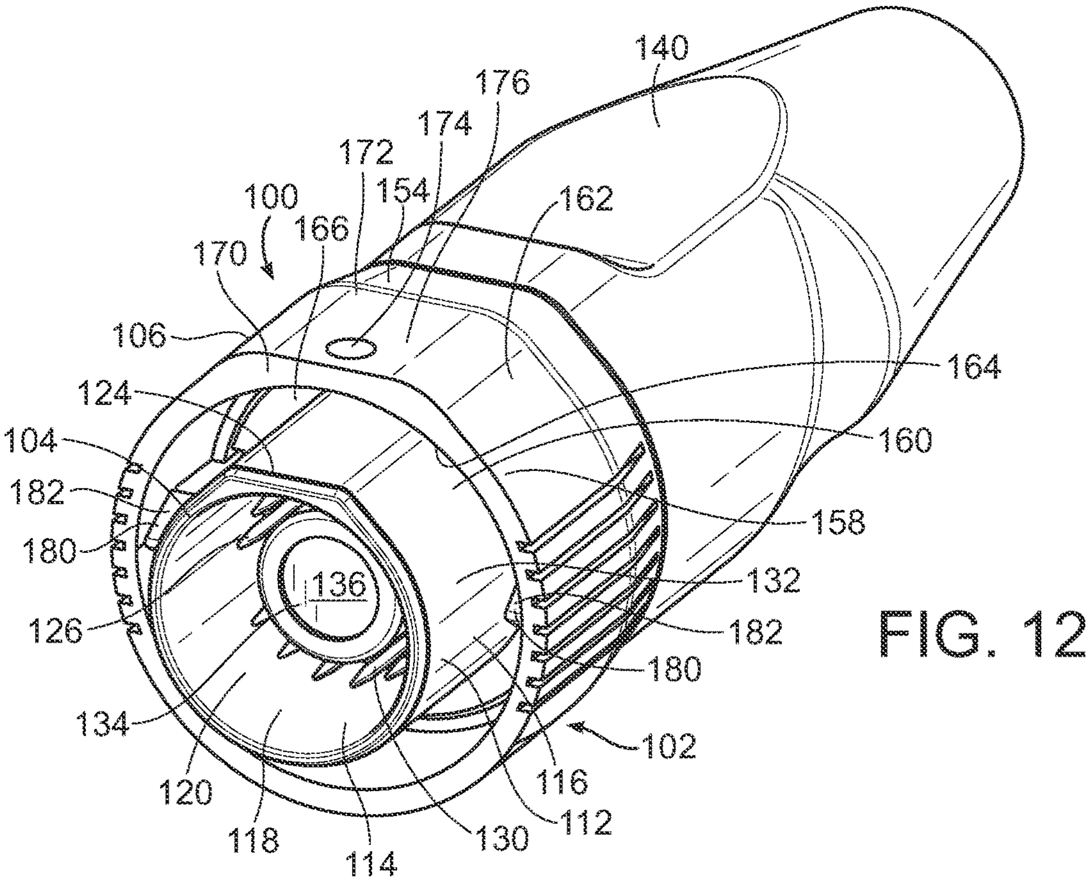
FIG. 12 is a perspective view from one angle of a first end of a second connector component of a self-locking connector in accordance with an example embodiment.
Figure 13:
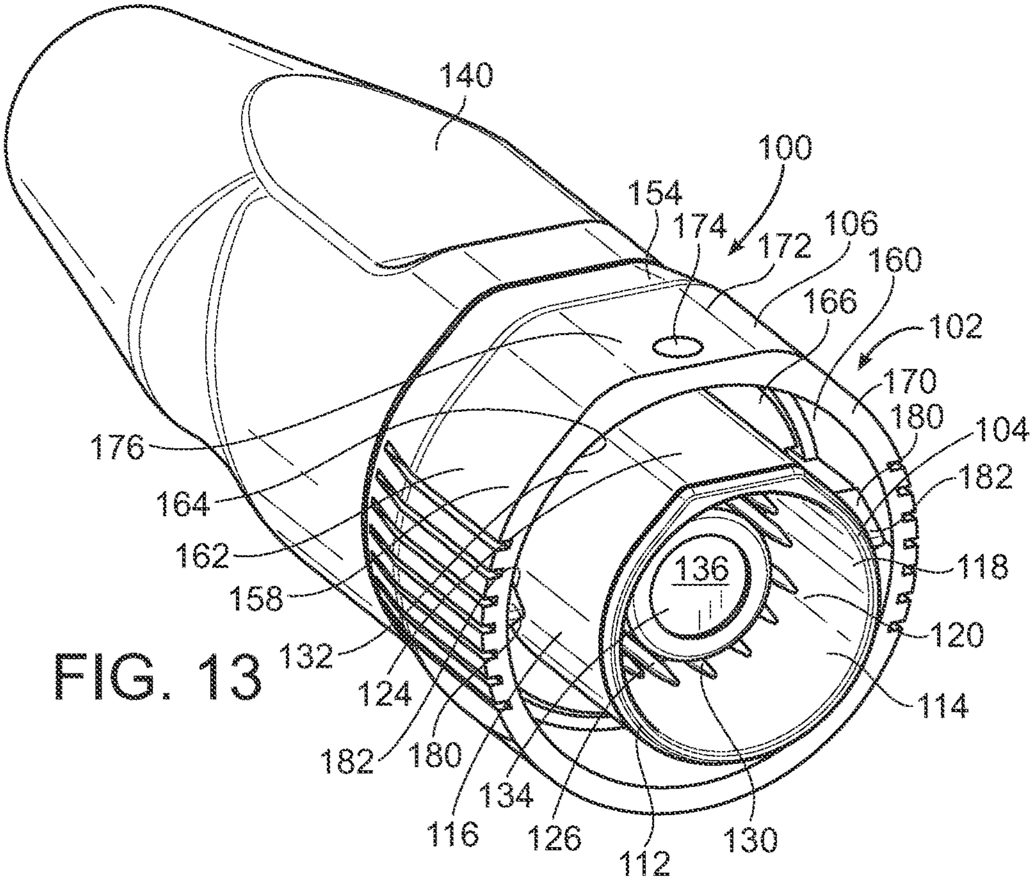
FIG. 13 is a perspective view from another angle of a first end of a second connector component of a self-locking connector in accordance with an example embodiment.

The second end opening 114 may comprise a second connector orientation key 124. The key 124 may comprise a flat as illustrated in FIGS. 12-13 and others. The key 124 also may comprise one or more flats, indents, or protrusions, or a combination thereof, for example. The key 124 may be formed in or located on or adjacent to a periphery of the second end opening 114 or at another location. The key 124 is adapted to enable the second end opening 114 to receive the first connector protrusion 48 of the first connector housing 22 of the first connector component 20 for the first connector component 20 and the second connector component 100 to be coupled in only a predetermined orientation or orientations. In that predetermined orientation or orientations, the key 124 is aligned with the key 40 of the first connector housing 22, and the electrically conductive elements 42, 126, the first and second magnetic elements 62, 134 and the first and second lock elements 80, 180 of the first and second connector component 20, 100 are aligned. The key 124 is adapted to prevent reception of the first connector protrusion 48 and coupling of the first and second connector components 20, 100 in any other orientation.

The second connector housing 102 may comprise a second connector protrusion 132. The second connector protrusion 132 may comprise all or part of the second end 112 of the stationary housing component 104. The second connector protrusion 132 preferably forms a single monolithic structure with the stationary housing component 104 but can also be a separate structure that is connected to the stationary housing component 104 by suitable means, including for example a press fit, weld, suitable adhesive, or a combination thereof.

The second connector protrusion 132 surrounds the second end opening 114 of the stationary housing component 104 and the portion of the interior space 120 containing the second end portions 130 of the electrically conductive elements 126. The second end portions 130 are recessed within the second connector protrusion 132. The second connector protrusion 132 terminates at the second end opening 114 of the stationary housing component 104.

The second connector protrusion 132 is surrounded by the movable housing component 106 and extends longitudinally through the movable housing component 106 between a first end opening 156 and a second end opening 160 and outwardly from the second end opening 160. The second end opening 114 of the stationary housing component 104 corresponds with a second end opening of the second connector protrusion 132. The second end opening 114 and the interior space 120 of the stationary housing component 104 are exposed and accessible through the second end opening 160 of the movable housing component 106.

The interior space 120 is adapted to receive and retain the second magnetic element 134, which is described further below. The second magnetic element 134 may be retained in the interior space 120 using any suitable means including press fit, welding, adhesive, or a combination thereof. The second magnetic element 134 has a second magnetic surface 136. The second magnetic element 134 is preferably recessed from the second end opening 114 within the interior space 120 with the second magnetic surface 136 exposed and accessible through the second end opening 160 of the movable housing component 106 and the second end opening 114 of the stationary housing component 104. The one or more electrically conductive elements 126 are preferably spaced apart around the second magnetic element 134.

As described above, when the first and second connector components 20, 100 are aligned and brought together to be put in a coupled state, the second magnetic surface 136 will preferably be aligned with and facing the first second magnetic element 62 and the first and second magnetic elements 62, 136 and generate a force to urge the first and second connector components 20, 100 in the coupled state and the first and second lock elements 80, 180 in locked engagement. For example, the stationary housing component 104 can have a longitudinal axis and the second magnetic element 134 can be positioned on and aligned with the longitudinal axis.

The second connector protrusion 132 can be formed or constructed in a substantially cylindrical shape with a substantially circular cross-section if desired. Alternatively, the second connector protrusion 132 can be formed in any other geometric shape with any other cross-sectional shape that is suitable. The second connector protrusion 132 also can have a longitudinal axis and can be arranged to be concentric or otherwise coaxial with a longitudinal axis of the stationary housing component 104 and the mobile housing component 106 of the second connector housing 102.

As described above and further below, the second connector protrusion 132 preferably is arranged, dimensioned, and positioned relative to the first connector protrusion 48 of the first connector housing 22 so that when the first and second connector components 20, 100 are put in the coupled state the second connector protrusion 132 is received and extends within the interior space 34 of the first connector housing 22, the first connector protrusion 48 is received in the second end opening 114 and extends within the interior space 120 of the second connector protrusion 132, and the second connector protrusion 132 substantially surrounds the first connector protrusion 48 in a nested or interleaved coupled arrangement. This isolates and protects the electrically conductive elements 42, 126, and the first and second magnetic elements 62, 134 from the external environment.

The exterior surface 116 at or near the first end 110 of the stationary housing component 104 may be provided with a first end connector 138. The first end connector 138 may comprise a threaded connector. The first end connector 138 may also comprise a snap connector, bayonet connector, or any other suitable type of connector. The first end connector 138 is adapted to enable the second connector component 100, and more specifically the second connector housing 102, to be connected temporarily, semi-permanently, or permanently to another connector, a device, a piece of equipment, a housing of a device or piece of equipment, a panel of a cabinet, or the like having a corresponding connector.

In addition or alternatively, a protective cover 140 such as a boot or the like may be connected to the second connector housing 102 at or near the first end 108. The protective cover 140 may be connected to the second connector housing 102 via the first end connector 138 or via another connector leaving the first end connector 138 available to connect to another connector, device, etc. The protective cover 140 preferably surrounds and extends outwardly for a distance from the first end opening 110 of the stationary housing component 104. The protective cover 140 is adapted to substantially enclose the first end 108 and the first end opening 110 of the stationary housing component 104 and to protect the second end portions 130 of the electrically conductive elements 126, the ends of the electrical conductors received in the first end opening 110, and the connections between the two from exposure to and potential damage from the external environment.

The exterior surface 116 may also comprise a coupling 142 for rotatably or otherwise movably coupling the movable housing component 106 with the stationary housing component 104. The coupling 142 may be disposed on and/or in the exterior surface 116 between the first end 108 and the second end 112 of the stationary housing component 104. The coupling 142 may comprise a spring 144 or other biasing means. The spring 144 is adapted to engage the movable housing component 106 and to urge the movable housing component 106 and the second lock component 180 described below to rotate or otherwise move in a first direction relative to the stationary housing component 104 and the first connector housing 22 of the first connector component 20 to help automatically bring the first and second lock elements 80, 180 in locked engagement as the first and second connector components 20, 100 are brought together in the coupled state. The spring 144 also is adapted to oppose rotation or other motion of the movable housing component 106 and the second lock component 180 in a second direction to bring the second lock component 180 out of locked engagement with the first lock component 80.

In one example embodiment, the coupling 142 comprises a slot 146 formed in the exterior surface 116 of the stationary housing component 104. The slot 146 preferably extends circumferentially at least partially around the exterior surface 116. The slot 146 is adapted to receive, engage, and guide one or more coupling protrusions 168 disposed on the movable housing component 106 to rotatably or otherwise movably couple the movable housing component 106 to the stationary housing component 104. As the movable housing component 106 rotates or otherwise moves in a first direction and a second direction relative to the stationary housing component 104, the one or more coupling protrusions move within the slot 146 in the first direction and in the second direction.

The slot 146 may be arranged substantially perpendicularly to a longitudinal axis of the stationary housing component 104 so that the movable housing component 106 is rotatable or otherwise movable substantially perpendicularly to the longitudinal axis. The slot 146 may be arranged at other angles relative to the longitudinal axis if it is desired for the movable housing component 106 to be movable with a component of motion in the directions of the longitudinal axis as well.

The slot 146 may comprise one or more stops 148. The stops 148 may coincide with one or more ends of the slot 146 or may be disposed in the slot 146 at desired locations. The stops 148 are adapted to define the limits of the range of rotation or other motion of the movable housing component 106 relative to the stationary housing component 104 and the first connector housing 22 of the first connector component 20. The stops 148 are also adapted to engage the one or more coupling protrusions 168 of the movable housing component 106 to prevent further rotation or other motion of the movable housing component 106 beyond the defined limits.

The spring 144 may have a first end 150 and a second end 152. The spring 144 may be disposed in the slot 146 with the first end 150 being movable relative to the second end 152 and the second end 152 being fixed. The first end 150 is preferably adapted to be engaged by the one or more coupling protrusions 168 of the movable housing component 106. The spring 146 is preferably configured and arranged to exert a bias force on the movable housing component 106 and the second lock element 180 through the one or more coupling protrusions 168. The bias force preferably urges the movable housing component 106 and the second lock element 180 to rotate or otherwise move in the first direction to urge the second lock element 180 in locked engagement with the first lock element 80 of the first connector housing 22 of the first connector component 20. The bias force preferably opposes rotation or other motion of the movable housing component 106 and the second lock element 180 in the second direction to bring the second lock element 180 out of locked engagement with the first lock element 80.

It will be appreciated that while the example embodiment has been described as employing a spring 144, any suitable compressible elastic element that is able to provide at least the same functionality as described may be used. Thus, as used herein the spring 144 is intended to and should be interpreted to include all such elements. It will also be appreciated that while one example embodiment of the coupling 142 has been described as including a slot 146 inset in the exterior surface 116 of the stationary housing component 104, the coupling may comprise other structures formed on and/or protruding from the exterior surface 116, raised ribs or rails for example, and/or a combination of structures formed in, on, and protruding from the exterior surface 116.

Turning to the movable housing component 106, the movable housing component has a first end 154 with a first end opening 156, a second end 158 with a second end opening 160, an exterior surface 162, an interior surface 164, and an interior space 166. The interior space 166 is exposed and accessible through the first end opening 156 and the second end opening 160.

The movable housing component 106 may be substantially cylindrical in shape with a substantially circular cross-sectional shape. Alternatively, it may have other overall shapes and cross-sectional shapes as desired. The movable housing component 106 may have a longitudinal axis between the first end 154 and the second end 156. The movable housing component 106 may be concentric or otherwise coaxial with the stationary housing component 104.

The movable housing component 106 preferably comprises one or more coupling protrusions 168 disposed on the interior surface 164 between the first end 154 and the second end 158. The one or more coupling protrusions 168 protrude into the interior space 166. The one or more coupling protrusions 168 are positioned, arranged, and configured to extend into and to be retained in the slot 146 of the coupling 142 on the exterior surface 116 of the stationary housing component 104 to rotatably or otherwise movably couple the movable housing component 106 with the stationary housing component 104. The one or more coupling protrusions 168 are also positioned and arranged to provide for a desired range of rotational or other motion of the movable housing component 106 relative to the stationary housing component 104 and the first connector housing 22 of the first connector component 20. One or more of the coupling protrusions 168 are also positioned and adapted to be in engagement with the spring 144, and more specifically the movable first end 150, to transfer the urging and opposing bias force from the spring 144 to the movable housing component 106 and the second lock element 180 as described herein.

The second lock element 180, which is described further below, also may be provided on and/or in the interior surface 164 at or near the second end 158 and recessed from the second end opening 160 in the interior space 166. The second lock element 180 may comprise one or a plurality of lock elements 180 spaced apart on or in, or a combination thereof, the interior surface 164. The plurality of lock elements 180 may be radially spaced apart in an arrangement and the spacing and arrangement preferably corresponds with the spacing and arrangement of the first lock elements 80 on the first connector housing 22 so that the first and second lock elements 80, 180 are aligned to be brought in locked engagement automatically when the first and second connector components 20, 100 are aligned and brought together in the coupled state.

The movable housing component 106 also preferably comprises a surface 170 at the second end 158 that preferably extends at least partially around the second end opening 160. The surface 170 is adapted to engage the collar 68 of the first connector housing 22 of the first connector component 20 when the first and second connector components

20, 100 are brought together and put in the coupled state to prevent over-insertion of the components of the respective connectors and to facilitate proper coupling, locking, and electrical connection.

The movable housing component 106 may comprise a second connector alignment mark 172. The second connector alignment mark 172 may be provided on the exterior surface 162 of the movable housing component 106 at or near the second end 160 and second end opening 162 or in another location on the movable housing component 106 or even the stationary housing component 104. The second connector alignment mark 172 may comprise a visual mark, such as a dot 174 or other visual representation, and/or a tactile mark, such as a flat 176 or other geometric shape. The second connector alignment mark 172 is adapted to indicate the orientation of the second connector component 100 in relation to the first connector component 20 to facilitate putting the second connector component 100 and the first connector component 20 in a coupled and locked state. The second connector alignment mark 172 is adapted to be used together with the first connector alignment mark 70 of the first connector component 20, which is described above. When the first and second connector alignment marks 70, 172 are aligned, it provides an indication that the first and second connector components 20, 100 are in the proper orientation and alignment to be put in the coupled state. More specifically, they indicate that the electrically conductive elements 42, 126, the first and second magnetic components 62, 134, and the first and second lock elements 80, 180 of the first and second connector components 20, 100 respectively are in proper alignment for the first and second connector components 20, 100 to be brought together and put in the coupled state with the first and second lock elements 80, 180 in locked engagement.

As described above, the stationary and movable housing components 104, 106 are arranged and configured so that the second connector protrusion 132 of the stationary housing component 104 extends through the interior space 166 of the movable housing component 106 between the first end opening 156 and the second end opening 158 and extends outward from the second end opening 158. This leaves a portion of the interior space 166 of the movable housing component 106 between the exterior surface 116 of the stationary housing component 104 and the interior surface 164 of the movable housing component unoccupied, and exposed and accessible through the second end opening 160 of the movable housing component 106.

As the first and second connector components 20, 100 are brought together into the coupled state, the force of the first and second magnetic elements 62, 134 urge the first connector housing 22 and the second connector housing 102 into the nested or interleaved coupled arrangement described above. In addition, the force of the first and second magnetic elements 62, 134 urges the first and second lock elements 80, 180 in locked engagement. The second end 28 of the first connector housing 22 is received in the second end opening 160 of the movable housing component 106 and extends within the interior space 166 of the movable housing component 106 between the exterior surface of the second connector protrusion 132 of the stationary housing component 104 and the interior surface 164 of the movable housing component 106. This causes the first lock element 80 in and/or on the exterior surface 32 of the first connector housing 22 and the second lock element 180 in and/or on interior surface 164 of the movable housing component 106 to engage and enter into locked engagement in the manner described above.

With the first and second connector components 20, 100 in the coupled and locked state as described above, the electrically conductive elements 42 and 126 are electrically coupled and make a plurality of electrical connections. The first and second magnetic elements 62, 134 are in contact or in close proximity and urge the first and second connector components 20, 100 to remain in the coupled state. The electrically conductive elements 42, 126, and the first and second magnetic elements 62, 134 are substantially surrounded and enclosed by the nested or interleaved first and second connector protrusions 48, 132 of the first and second connector housings 22, 102 and also by the nested or interleaved arrangement of the second end 28 of the first connector housing 22 and the movable housing component 106 of the second connector housing 102. Thus, all of the electrically conductive elements, magnetic elements and lock elements are enclosed and isolated from exposure to and possible damage from the external environment.

3. Electrically Conductive Elements.

Like electrically conductive elements 42 of the first connector component 20, electrically conductive elements 126 of the second connector component 100 may comprise one or more electrically conductive pins, electrically conductive sockets or receptacles, or a combination thereof. Electrically conductive elements 126 also may comprise one or more electrical contacts and/or one or more non-contact electrodes. Electrically conductive elements 126 may be constructed in the same ways and with the same materials as described in connection with electrically conductive elements 42.

Like electrically conductive elements 42, each electrically conductive element 126 has a first end portion 128 and a second end portion 130. As described further herein, the first end portion 128 is preferably adapted to be electrically coupled to an end of an electrical conductor to receive and/or transfer electrical signals and/or power. The second end portion 130 is preferably adapted to be electrically coupled to a second end portion 46 of a corresponding electrically conductive element 42 of the first connector component 20 to form an electrical connection.

Similar to the one or more electrically conductive elements 42, the one or more electrically conductive elements 126 may comprise separate structures, and may comprise a single unitary structure. For example, the one or more electrically conductive elements 126 can be mounted or connected to a common base 127 or other common mounting structure, which will preferably comprise an electrically non-conductive insulator.

The electrically conductive elements 126 are adapted to be electrically coupled with corresponding electrically conductive elements 42 of the first connector component 20 to provide an electrical connection when the first connector component 20 and the second connector component 100 are put in a coupled state, and to be electrically decoupled from the corresponding electrically conductive elements 42 of the first connector component 20 to break the electrical connection when the first connector component 20 and the second connector component 100 are brought out of the coupled state. Electrically conductive elements 126 may be electrically coupled with electrically conductive elements 42 in the same manners as described above with respect to electrically conductive elements 42, e.g., physical connection or proximity, depending on the form(s) of the electrically conductive elements 42, 126.

The electrically conductive elements 126 may be disposed within the interior space 120 of the stationary housing component 104 of the second connector housing 102 with the first end portions 128 of the electrically conductive elements 126 exposed in the first end opening 110 and the second end portions 130 recessed in the interior space 120 of the stationary housing component 104 and exposed and accessible through the second end opening 114 of the second connector protrusion 132 of the second connector housing 22. The electrically conductive elements 126 may be disposed within the interior space 120 in any suitable manner including for example press fitting within passages or guides, suitable adhesive, or a combination of thereof.

In one example embodiment of the second connector component 100 best illustrated in FIG. 21, the electrically conductive elements 126 comprise elongated electrically conductive protruding pins. The pins may comprise elongated solid, partially solid, or hollow structures. In this example embodiment, the first end portions 128 of the pins may have indents, such as solder cups, adapted to be physically and electrically connected to the ends of wires, pins or other electrical conductors to receive electrical signals and/or power. The wires or other electrical conductors may comprise separate wires, wires carried together in a cable or sheath, pins or other electrical conductors. The physical and electrical connection may be made via solder or another means of mechanical connection. The connection may be made directly or indirectly. For example, the ends of the electrical conductors may be connected to a set of attachment points location on a circuit board and the first end portions 128 of the pins may be connected to the same or another set of attachment points on the circuit board either directly or via jumper wires for example.

This example embodiment of the second connector component 100 is particularly adapted for use with the example embodiment of the first connector component 20 as illustrated in FIGS. 1-11, in which the corresponding electrically conductive elements 42 comprise elongated electrically conductive sockets or receptacles. Accordingly, the second end portions 130 of the pins are preferably adapted to enter the openings of the second end portions 46 of the corresponding electrically conductive sockets or receptacles, and to be received and retained in physical and electrical contact with the sockets or receptacles to make electrical connections when the first connector component 20 and the second connector component 100 are in the coupled state. In that regard, the second end portions 130 may be pointed, beveled, rounded, or otherwise configured to facilitate entry into the second end portions 46 of the electrically conductive sockets or receptacles.

It will be appreciated from the description herein that the electrical connections formed by the electrically conductive elements 42, 126 when the first connector component 20 and the second connector component 100 are put in the coupled state are enclosed within and isolated and protected from the external environment by the nested or interleaved coupled arrangement of the first and second connector housings 22, 102.

4. Second Magnetic Element.

The second magnetic element 134 has a second magnetic surface 136. The second magnetic element 134 and the second magnetic surface 136 may be essentially identical to the first magnetic element 62 and the first magnetic surface 64 described above. The second magnetic element 134 also may be constructed of the same types of magnetic or magnetic-attractive materials and may comprise the same types of magnets as the first magnetic element 62. Further, the second magnetic element 134 may function with the first magnetic element 62 to generate the same types and directions of magnetic forces as described above with respect to the first magnetic element 62. In other words, the second magnetic element 134 and the first magnetic element 62 are preferably exchangeable without altering the functionality of the example embodiments of the self-locking connector 10.

The second magnetic element 134 may be disposed within the interior space 120 of the stationary housing component 104 recessed from the second opening 114 of the second connector protrusion 132 and with the second magnetic surface 136 exposed and accessible through the second end opening 114. The stationary housing component 104 may have a longitudinal axis and the second magnetic element may be disposed and aligned on the longitudinal axis.

In the same manner as describe above, the second magnetic element 134 is adapted and configured to function with the first magnetic element 62 to generate a force in a first direction to urge the first and second connector components 20, 100 in the coupled state and the first and second lock elements 80, 180 in locked engagement when the first connector component 20 and the second connector component 100 are brought together to be put in the coupled state. Accordingly, the second magnetic element 134 may be disposed within the interior space 120 of the stationary housing component 104 so that when the first and second connector components 20, 100 are aligned and brought together to be put in the coupled state, the second magnetic surface 136 faces and is in proximity to the first magnetic surface 64 of the first magnetic element 62 of the first connector component 20, and when the first and second connector components 20, 100 are in the coupled state the second magnetic surface 136 will be in contact or in close proximity to the first magnetic surface 64 to maintain the coupled state.

Like the first magnetic element 62, with the first and second connector components 20, 100 in the coupled state, the second magnetic element 134 and the second magnetic surface 136 are enclosed and isolated from the external environment by the nested or interleaved coupled arrangement of the first and second connector housings 22, 102. Even when the first and second connector components 20, 100 are not in the coupled state, the second magnetic element 134 and the second magnetic surface 136 are protected from the external environment and potential damage by being recessed within the interior space 120 of the stationary housing component 104.

5. Second Lock Element.

As described above, the second lock element 180 may be provided on and/or in the interior surface 164 of the movable housing component 106 at or near the second end 158 and recessed from the second end opening 160 in the interior space 166. The second lock element 180 may comprise one or a plurality of lock elements 180. The lock elements 180 may be spaced apart and arranged radially around the second end opening 160 of the movable housing component 106 and exposed and accessible through the second end opening 160. Preferably the spacing and arrangement of the second lock elements 180 corresponds with the spacing and arrangement of the first lock elements 80 on the first connector housing 22 so the first and second lock elements 80, 180 are in alignment when the first and second connector components 20, 100 are aligned and brought together to be put in the coupled state.

The second lock element 180 is adapted to be brought into locked engagement with the first lock element 80 automatically when the first and second connector components 20, 100 are brought together and put in the coupled state without any further operator or user intervention. The second lock element 180 is also adapted to be brought out of locked engagement with the first lock element 80 manually to enable the first connector component 20 and the second connector component 100 to be brought out of the coupled state to break an electrical connection.

As described herein, with the second lock element 180 disposed on the movable housing component 106, the first lock element 80 disposed on the first connector housing 22 of the first connector component 20, and the movable housing component 106 being rotatable or otherwise movable relative to the first connector housing 22, the movable housing component 106 and the second lock element 180 may be rotatable or otherwise movable relative to the first connector housing 22 and the first lock element 80 to bring the second lock element 180 and the first lock element 80 into and out of locked engagement. The movable housing component 106 and the second lock component 180 may be automatically rotatable or otherwise movable in the first direction relative to the first connector housing 22 and the first lock component 80 to automatically bring the first lock element 80 and the second lock element 180 in locked engagement without any operator or user intervention other than to bring the first and second connector components 20, 100 together. The movable housing component 106 and the second lock component 180 may be rotatable in the second direction in response to manual manipulation to manually bring the first lock element 80 and the second lock element 180 out of locked engagement.

In one example embodiment, two second lock elements 180 are disposed on the interior surface 164 of the movable housing component 106 of the second connector housing 102 of the second connector component 100. It will be appreciated however that only one or more than two second lock elements 180 may be employed as desired.

The two second lock elements 180 may be spaced apart around the second end opening 160 radially and equidistant or otherwise as desired provided they are arranged and spaced to align with the corresponding first lock elements 80 on the first connector component 100 when the first and second connector components 20, 100 are aligned to be put in the coupled state. In one example embodiment, the two second lock elements 180 may be spaced apart on opposite sides of the second end opening 160 by approximately 180 degrees.

The second lock elements 180 may be identical, however it will be appreciated that they need not be identical. However, since in the example embodiment illustrated they are identical, it will suffice to describe one below and that description is intended to apply equally to the other.

The second lock element 180 may comprise a lock protrusion 182. The lock protrusion 182 may protrude from the interior surface 164 of the movable housing component 106 into the interior space 166. In one example embodiment, the lock protrusion 182 may comprise a substantially triangular-shaped protrusion.

The lock protrusion 182 may be configured and adapted to enter and to be retained in the lock receptacle 82 of the first lock element 80 to put and maintain the first and second lock elements 80, 180 in locked engagement. The lock protrusion 182 may be configured and adapted to exit the lock receptacle 82 to bring the first and second lock elements 80, 180 out of locked engagement and to bring the first and second connector components 20, 100 out of the coupled state.

More specifically, the lock protrusion 182 may be configured and adapted to enter the elongated slot 88 of the lock receptacle 82 through the opening 90 to bring the second lock element 180 into locked engagement with the first lock element 80. The lock protrusion 182 may further be configured and adapted to be retained in the slot 88 in engagement with the surface 92 of the lock receptacle 82 while being blocked from moving in a direction that would enable the first connector component 20 to be decoupled from the second connector component 100 while the first lock element 80 and the second lock element 180 are in locked engagement.

Still further, the lock protrusion 182 may be adapted and configured to be rotatable or otherwise movable with the movable housing component 106 at an angle with respect to the direction of motion to bring the first and second connector components 20, 100 into and out of the coupled state in order to enter and exit the opening 90 and the slot 88 and bring the first and second lock elements 80, 180 into and out of locked engagement. Where that angle is substantially perpendicular to the direction of motion required to bring the first and second connector components 20, 100 into and out of the coupled state, as in the example embodiment, the lock protrusion 182 may be adapted and configured to be rotatable or otherwise movable in a direction substantially perpendicular to that direction to enter and exit the slot 88 of the lock receptacle 82 through the opening 90 to bring the first and second lock elements 80, 180 into and out of locked engagement.

It will be appreciated that the lock protrusion 182 may have various shapes, arrangements, and orientations other than the substantially triangular shape of the example embodiment in order to correspond with various shapes, arrangements and orientations of the elements and structures of the lock receptacle 82 and that such variations are consistent with the concepts, functions, and purposes described herein. It will also be appreciated that the lock protrusion 182 may comprise additional structures to correspond with additional structures of the lock receptacle 82 and that these variations also are consistent with the concepts, functions, and purposes described herein. It will further be appreciated that the lock protrusion 182 may comprise not only one protrusion, but also one or more protrusions and/or inset features on and/or in the interior surface 164 of the movable housing component 106, and that again such variations are consistent with the concepts, functions, and purposes described herein.

The second lock element 180 may comprise one or more engagement surfaces adapted for relative movable engagement with one or more corresponding engagement surfaces of the first lock element 80. The engagement surfaces may be configured and adapted for relative movable engagement with the corresponding engagement surfaces in a first direction to bring the first and second lock elements 80, 180 in locked engagement and in a second direction to bring the first and second lock elements 80, 180 out of locked engagement. The engagement surfaces may be configured and adapted for relative movable engagement with the corresponding engagement surfaces in a first direction automatically as the first and second connector components 20, 100 are brought together and put in the couple state to automatically cause the second lock element 180 to rotate or otherwise move in the first direction relative to the first lock element 80 to automatically bring the first and second lock elements 80, 180 in locked engagement. The engagement surfaces may be configured and adapted for relative movable engagement with the corresponding engagement surfaces in a second direction in response to manual manipulation by an operator or user to cause the second lock element 180 to manually rotate or otherwise move in the second direction relative to the first lock element 80 to manually bring the first and second lock elements 80, 180 out of locked engagement.

More specifically, the engagement surfaces may be configured and adapted for relative movable engagement with the corresponding engagement surfaces in a first direction automatically as the first and second connector components 20, 100 are brought together and put in the coupled state to automatically cause the lock protrusion 182 of the second lock element 180 to rotate or otherwise move in the first direction relative to the lock receptacle 82, e.g., the slot 88 and opening 90, to automatically bring the lock protrusion 182 into the lock receptacle 82 and the first and second lock elements 80, 180 in locked engagement. The engagement surfaces may also be configured and adapted for relative movable engagement with the corresponding engagement surfaces in a second direction in response to manual manipulation by an operator or user to manually rotate or otherwise move the lock protrusion 182 of the second lock element 180 in the second direction relative to the lock receptacle 82 of the first lock element 80 to manually bring the lock protrusion 182 out of the lock receptacle 82 and the first and second lock elements 80, 180 out of locked engagement.

In one example embodiment, the one or more engagement surfaces of the second lock element 180 may be disposed on the substantially triangular-shaped lock protrusion 182. The lock protrusion 182 may comprise a plurality of engagement surfaces 184, 186, 188. The first engagement surface 184 is configured and adapted to engage with a corresponding first engagement surface 84 of the first lock element 80 when the first connector component 20 and the second connector component 100 are aligned and brought together in the coupled state. The second engagement surface 186 is configured and adapted to engage with a corresponding second engagement surface 86 of the first lock element 80 when the first connector component 20 and the second connector component 100 are aligned and brought together in the coupled state. The third engagement surface 188 is configured and adapted to engage with the surface 92 of the first lock element 80 when the lock protrusion 182 is in the slot 88 of the lock receptacle 82 of the first lock element 80 to retain the lock protrusion 182 in the lock receptacle 82 and to prevent movement in a direction to enable the first connector component 20 and the second connector component 100 to be brought out of the coupled state while the first and second lock elements 80, 180 are in locked engagement.

The first engagement surface 184 is preferably arranged and configured to engage with the corresponding first engagement surface 84 to bring the lock protrusion 182 into alignment with the lock receptacle 82, and more specifically the opening 90 and slot 88 of the lock receptacle 82. The first engagement surface 184 may comprise an angled surface on one side of the lock protrusion 182 that is adapted to engage with the angled surface of the corresponding first engagement surface 84 for the lock protrusion 182 for the lock protrusion 182 to be directed around the surface 92 and into alignment with the opening 90. As the first and second connector components 20, 100 are brought together, the corresponding first engagement surface 184 engages and moves along the corresponding first engagement surface 84. This causes the movable housing component 106, the second lock element 180 and the lock protrusion 182 to rotate relative to the first connector housing 22 and the first lock element 80, and the lock protrusion 182 to rotate and move around the surface 92 and into engagement with the second corresponding engagement surface 86.

The second engagement surface 186 is preferably arranged and configured to engage with the corresponding second engagement surface 86 to bring the lock protrusion 182 into the lock receptacle 82 and to bring the first and second lock elements 80, 180 into locked engagement. More specifically, the second engagement surface 186 is adapted to engage with the corresponding second engagement surface 86 to bring the lock protrusion 182 through the opening 90 and into the slot 88 of the lock receptacle 82. The second engagement surface 186 may comprise an angled surface on a side of the lock protrusion 182 opposite the first engagement surface 184. The second engagement surface 186 is adapted to engage with the corresponding second engagement surface 86 to direct the lock protrusion 182 through the opening 90 and into the slot 88 of the lock receptacle 82. As the first and second connector components 20, 100 are brought further together, the second engagement surface 186 engages and moves along the corresponding second engagement surface 86. This causes the movable housing component 106, the second lock element lock 180, and the lock protrusion 182 to rotate relative to the first connector housing 22 and the first lock element 80 in a first direction, and the lock protrusion 182 to enter through the opening 90 and into the slot 88 of the lock receptacle 82 to bring the first and second lock elements 80, 180 in locked engagement.

With the lock protrusion 182 in the slot 88 of the lock receptacle 182, the third engagement surface 188 is adapted to engage with the surface 92 of the lock receptacle 82 to prevent the lock protrusion 182 from moving in a direction that would enable the first and second connector components 20, 100 to be brought out of the coupled state while the first and second lock elements 80, 180 are in locked engagement. The third engagement surface 188 may comprise a substantially flat surface on a side of the triangular-shaped lock protrusion 182 that comprises the base of the triangle and that joins the sides comprising the first and second engagement surfaces 184, 186.

As described above with respect to the first lock element 80, the first and second engagement surfaces 184, 186, of the lock protrusion 182 of the second lock element 180 automatically engage and move in engagement with the corresponding first and second engagement surfaces 84, 86 of the first lock element 80 in a first direction as the first connector component 20 and the second connector component 100 are brought together into the coupled state. This automatically causes the movable housing component 106, the first lock element 80, and the lock protrusion to rotate or otherwise move in a first direction relative to the first connector housing 22 and the first lock element 80, and causes the lock protrusion 182 of the second lock element 180 to enter and be retained in the lock receptacle 82, e.g., the slot 88 and opening 90, of the first lock element 80 to automatically bring the first and second lock elements 80, 180 in locked engagement. It will be appreciated that the foregoing occurs automatically as the first and second connector components 20, 100 are brought into the coupled state without any other intervention by an operator or user.

Also as described above with respect to the first lock element 80, the first and second engagement surfaces 184, 186, of the lock protrusion 182 can be manually caused to engage and move in engagement with the corresponding first and second engagement surfaces 84, 86 of the first lock element 80 in a second direction to manually bring the first and second lock elements 80, 180 out of locked engagement and the first and second connector components 20, 100 out of the coupled state. A user or operator may manually manipulate the movable housing component 106 of the second connector housing 102 to rotate or otherwise move relative to the first connector housing 22 in the second direction. This causes the lock protrusion 182 to rotate or otherwise move in a second direction to exit the lock receptacle 82, e.g., the slot 88 and opening 90, of the first lock element 80. With the lock protrusion 182 manually held clear of the surface 92 by the user or operator, the user or operator may then manually separate the first connector housing 22 and the second connector housing 122. This causes the lock protrusion 182 to move out of alignment with the opening 90 of the lock receptacle 82 and allows the first and second engagement surfaces 184, 186, of the lock protrusion 182 to engage and move in engagement with the corresponding first and second engagement surfaces 84, 86 of the first lock element 80 in the second direction. This in turn causes the second lock element 180 to rotate or otherwise move relative to the first lock element 80 back to its original position, manually brings the first and second lock elements 80, 180 out of locked engagement, and manually brings the first and second connector components 20, 100 out of the coupled state.

Similar to the description above with respect to the first lock element 80, the spring 144 or other biasing means may provide a bias force to urge the first lock element 80 and/or the second lock element 180 to rotate or move in the first direction to automatically bring the first and second lock elements 80, 180 in locked engagement, and to oppose the first lock element 80 and/or the second lock element 180 from being manually rotated or otherwise moved in the second direction to manually bring the first and second lock elements 80, 180 out of locked engagement. More specifically, the spring 144 may urge the lock protrusion 182 of the second lock element 180 to rotate or otherwise move in the first direction to enter the lock receptacle 82 to help automatically bring the first and second lock elements 80, 180 in locked engagement, and to oppose the lock protrusion 182 rotating or moving in the second direction to exit the lock receptacle 82 and bring the first and second lock elements 80, 180 out of locked engagement. Also as described above, the action of the first and second lock elements 80, 180 and the movable housing component 106 under the bias force of the spring 144 can provide tactile and visual feedback to an operator or user confirming the locked engagement status of the self-locking connector 10.

It will be appreciated that, as indicated above with respect to the first lock element 80, the second lock element 180 may be exchanged with the first lock element 80. That is, the second lock element 180 may be disposed on the first connector component 20 and the first lock connector 80 may be disposed on the second connector component 100 without changing the functionality of the example embodiments of the self-locking connector 10.

D. Operation of Preferred Embodiment

A preferred intended use of the example embodiment of the self-locking connector 10 is described below with reference to FIGS. 31-37 among others. The following description assumes the wires or other electrical connectors of cables, other connectors, devices, or equipment have been connected to the first end portions 44 of the electrically conductive elements 42 of the first connector component 20 and to the first end portions 128 of the electrically conductive elements 126 of the second connector component 100 in the manner described above.

In use, the first and second connector components 20, 100 are brought into proximity with their respective second ends 28, 112 and second end openings 30, 114 facing. The first and second connector components 20, 100 are brought into alignment with the first connector alignment mark 70 and the second connector alignment mark 172 aligned. In this orientation, the first and second connector orientation keys 40, 124, the corresponding electrically conductive elements 42, 126, the first and second magnetic elements 62, 134, and the first and second lock elements 80, 180 of the first and second connector components 20, 100 respectively are all in alignment, and the first and second connector components 20, 100 are ready to be brought into the coupled state.

The first and second connector components 20, 100 are then brought together to enter into the coupled state. As the first and second connector components 20, 100 are brought together, the first connector protrusion 48 of the first connector housing 22 enters the interior space 120 of the stationary housing component 104 of the second connector housing 102 through the second end opening 114, the second connector protrusion 132 enters the interior space 34 of the first connector housing 22 through the second end opening 30, and the second connector protrusion 132 of the stationary housing component 104 surrounds and encloses the first connector protrusion 48.

At the same time, the second end 28 of the first connector housing 22 enters into the interior space 166 of the movable housing component 106 of the second connector housing 102 between the exterior surface 116 of the second connector protrusion 132 of the stationary housing component 104 and the interior surface 164 of the movable housing component 106 until the collar 68 of the first connector housing 22 and the surface 170 at the second end 158 of the movable housing component 106 are in engagement. At that point, the second end of the first connector housing 22 is enclosed within the interior space 166 of the movable housing component 106, with the first connector protrusion 48 of the first connector housing 22 enclosed within the second connector protrusion 132 and also enclosed within the interior space 166 of the movable housing component 106. The electrical and magnetic connections provided by the self-locking connector 10 are thus enclosed within the nested or interleaved coupled arrangement of the first and second connector housings 22, 122 and are not exposed to the external environment.

Also at the same time, as the second end 28 of the first connector housing 22 enters into the interior space 166 of the movable housing component 106 of the second connector housing 102, the first lock element 80 on the exterior surface of the first connector housing 22 and the second lock element 180 on the interior surface 164 of the movable housing component 106 automatically become movably engaged and are automatically brought into locked engagement in the manner described in detail herein above.

As the first and second connector components 20, 100 are being brought together into the coupled state, the first and second magnetic elements 42, 126 provide a force in a direction to urge the first and second connector components 20, 100 in the coupled state and the first and second lock elements 80, 180 in locked engagement. When the elements of the first connector housing 22 and the second connector housing 102 are in the nested or interleaved arrangement described above and the first and second locking elements 80, 180 are in locked engagement, the first connector component 20 and the second connector component 100 are in the coupled state.

Under the force of the first and second magnetic elements 42, 126, the self-locking connector 10 provides a "click" or other audible feedback to the operator or user when the coupled state is entered. Under the force of the spring 144, the self-locking connector 10 provides tactile and visual feedback to the operator or user confirming the locked state as described above.

With the first and second connector components 20, 100 in the coupled state, the corresponding electrically conductive elements 42, 126 of the first and second connector components 20, 100 respectively are physically and electrically connected or in proximity and electrically coupled and the self-locking connector 10 creates or establishes an electrical connection between any devices, equipment, etc. electrically connected to the first and second connector components 20, 100 respectively. The first and second magnetic surfaces 64, 136 of the first and second magnetic elements 62, 134 respectively are in contact or in close proximity and generate a magnetic force to urge the first and second connector components 20, 100 to stay in the coupled state and oppose the first and second connector components 20, 100 being brought out of the coupled state.

If and when it is desired to bring the first and second connector components 20, 100 out of the coupled state, an operator or user manually manipulates the movable housing 106 of the second connector housing 102 and the first connector housing 22 to cause the movable connector component 106 to rotate or otherwise move relative to the first connector housing 22 in a second direction, which may be opposite of the first direction in which the movable housing 106 was automatically rotated or otherwise moved to bring the first and second lock elements 80, 180 into locked engagement. The operator or user then manually separates the first and second connector components 20, 100. This manually brings the first and second lock elements 80, 180 out of locked engagement in the manner described herein above, brings the first and second connector components 20, 100 out of the coupled state, places them in the decoupled state, and beaks any electrical connection.

Unless otherwise defined, all technical and scientific terms used herein have the same meaning as commonly understood by one of ordinary skill in the art to which this invention belongs. Although methods and materials similar to or equivalent to those described herein can be used in the practice or testing of the self-locking connector, suitable methods and materials are described above. All publications, patent applications, patents, and other references mentioned herein are incorporated by reference in their entirety to the extent allowed by applicable law and regulations. The self-locking connector may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An electrical connector, comprising:

a first connector component comprising a first electrically conductive element;

a second connector component comprising a second electrically conductive element; and wherein the first connector component and the second connector component are adapted to be brought together into a coupled state;

wherein the second connector component comprises a connector housing with a stationary component and a movable component, wherein a coupler rotatably couples the movable component to the stationary component, wherein the coupler comprises a spring that engages the movable component as the movable component rotates to rotatably bias the movable component toward a position in which the second connector component is couplable with the first connector component, wherein the spring comprises an arcuate portion of a compressible elastic element having a first end that is movable with respect to a fixed second end, and wherein the second connector being in the coupled state with the first connector serves to electrically couple the second electrically conductive element with the first electrically conductive element.

2. The electrical connector of claim 1, wherein the first connector component includes a first lock element and the second connector component includes a second lock element and wherein the first lock element and the second lock element are in a state of locked engagement during the second connector component being coupled to the first connector component.

3. The electrical connector of claim 2, wherein the first lock element comprises one of a first lock protrusion or a first receptacle, the second lock element comprises one of a second lock protrusion corresponding to the first receptacle or a second receptacle corresponding to the first lock protrusion, and the first receptacle is adapted to receive and retain the corresponding second lock protrusion or the second receptacle is adapted to receive and retain the first lock protrusion.

4. The electrical connector of claim 2, wherein the first lock element comprises a first engagement surface, the second lock element comprises a second engagement surface, and the first engagement surface and the second engagement surface are adapted for relative movable engagement in a first rotational direction to bring the first lock element and the second lock element into the locked engagement and in a second opposite rotational direction to bring the first lock element and the second lock element out of the locked engagement.

5. The electrical connector of claim 2, wherein at least one of the first lock element and the second lock element is automatically rotatable relative to the other in a first rotational direction to bring the first lock element and the second lock element into the locked engagement, and is manually rotatable relative to the other in a second opposite rotational direction to bring the first lock element and the second lock element out of the locked engagement.

6. The electrical connector of claim 2, wherein the first lock element comprises a first plurality of lock elements spaced apart on the first connector component and the second lock element comprises a second plurality of lock elements spaced apart on the second connector component.

7. The electrical connector of claim 2, wherein the first connector component comprises a first connector housing and the first lock element is disposed on the first connector housing, wherein the connector housing of the second connector component comprises a second connector housing and the second lock element is disposed on the second connector housing, and wherein the first connector housing is adapted to be disposed at least partially within the second connector housing with the first connector component and the second connector component in the coupled state and the first lock element and the second lock element in the locked engagement.

8. The electrical connector of claim 7, wherein the first connector housing comprises a first exterior surface and the first lock element is disposed on the first exterior surface, and the second connector housing comprises an interior space and the second lock element is disposed in the interior space.

9. The electrical connector of claim 7, wherein the second lock element is disposed on the movable component of the second connector housing, and the movable component of the second connector housing is automatically rotatable relative to the stationary component, and wherein the first connector housing rotates in a first rotational direction to bring the first lock element and the second lock element into the locked engagement.

10. The electrical connector of claim 2, wherein at least one of the first lock element and the second lock element is automatically rotatable relative to the other in a first rotational direction to bring the first lock element and the second lock element into locked engagement, and is manually rotatable relative to the other in a second opposite rotational direction to bring the first lock element and the second lock element out of the locked engagement.

11. The electrical connector of claim 2, wherein the movable component is manually rotatable relative to the first connector housing in a second opposite rotational direction to bring the first lock element and the second lock element out of the locked engagement.

12. The electrical connector of claim 2, wherein the first lock element and the second lock element are adapted to be brought out of the locked engagement manually to put the first connector component and the second connector component in a decoupled state.

13. The electrical connector of claim 1, wherein the first connector component comprises a first orientation key, the second connector component comprises a second orientation key, and at least one of the first orientation key and the second orientation key is adapted to receive the other orientation key when the first electrically conductive element and the second electrically conductive element are electrically coupled.

14. The electrical connector of claim 1, wherein the coupler is attached to the stationary component and the movable component comprises a protrusion that is positioned to engage the spring as the movable component rotates relative to the stationary component.

15. An electrical connector, comprising:

a first connector component comprising a first electrically conductive element and a first magnetic element;

a second connector component comprising a second electrically conductive element and a second magnetic element;

wherein the first connector component and the second connector component are adapted to be brought together into a coupled state;

wherein the first magnetic element and the second magnetic element are adapted to urge the first connector component and the second connector component into the coupled state; and wherein the second connector component comprises a connector housing with a stationary component and a movable component, wherein a coupler rotatably couples the movable component to the stationary component, wherein the coupler comprises a spring that engages the movable component as the movable component rotates to rotatably bias the movable component toward a position in which the second connector is couplable with the first connector, wherein the spring comprises an arcuate portion of a compressible elastic element having a first end that is movable with respect to a fixed second end, and wherein the second connector being in a coupled state with the first connector serves to electrically couple the second electrically conductive element with the first electrically conductive element.

16. The electrical connector of claim 15, wherein the first connector component comprises a first orientation key, the second connector component comprises a second orientation key, and at least one of the first orientation key and the second orientation key is adapted to receive the other orientation key when the first electrically conductive element and the second electrically conductive element are electrically coupled.

17. The electrical connector of claim 15, wherein the coupler is attached to the stationary component and the movable component comprises a protrusion that is positioned to engage the spring as the movable component rotates relative to the stationary component.

18. The electrical connector of claim 15, wherein the first connector component additionally comprises a first lock element and the second connector component additionally comprises a second lock element, and wherein the first magnetic element and the second magnetic element urge the first lock element and the second lock element into locked engagement.

* * * * *